(12) United States Patent
Lalchandani

(10) Patent No.: US 11,162,577 B2
(45) Date of Patent: Nov. 2, 2021

(54) CONSOLE GEAR-SHIFT SPILL GUARD FOR CAR, AUTOMOBILE, TRUCK, AND OTHER VEHICLES

(71) Applicant: Sulochna Lalchandani, Foster City, CA (US)

(72) Inventor: Sulochna Lalchandani, Foster City, CA (US)

( * ) Notice: Subject to any disclaimer, the term of this patent is extended or adjusted under 35 U.S.C. 154(b) by 168 days.

(21) Appl. No.: 16/257,002

(22) Filed: Jan. 24, 2019

(65) Prior Publication Data
US 2019/0226577 A1    Jul. 25, 2019

Related U.S. Application Data

(60) Provisional application No. 62/621,767, filed on Jan. 25, 2018, provisional application No. 62/760,828, filed on Nov. 13, 2018.

(51) Int. Cl.
*F16H 59/02*    (2006.01)

(52) U.S. Cl.
CPC .............................. *F16H 59/0213* (2013.01)

(58) Field of Classification Search
CPC ............... F16H 59/0213; G05G 25/04; H01H 2009/048; B60R 13/0262; Y10S 383/00; Y10S 383/902; Y10S 383/907
USPC .................. D12/114, 179; 383/106, 43, 118; 116/28.1
See application file for complete search history.

(56) References Cited

U.S. PATENT DOCUMENTS

| | | | | |
|---|---|---|---|---|
| 1,523,259 | A * | 1/1925 | Curry ................... | F16H 59/0213 180/90.6 |
| 1,735,826 | A * | 11/1929 | Lietzke ............... | F16H 59/0213 74/473.36 |
| 2,471,701 | A * | 5/1949 | Post ....................... | A01K 37/00 383/41 |
| 3,086,609 | A * | 4/1963 | Bryant, Jr. .......... | F16H 59/0213 180/90.6 |

(Continued)

FOREIGN PATENT DOCUMENTS

| JP | 2002205566 A * | 7/2002 | |
|---|---|---|---|
| JP | 2011105025 A * | 6/2011 | ......... F16H 59/0213 |
| WO | WO-2018007719 A1 * | 1/2018 | ......... F16H 59/0213 |

OTHER PUBLICATIONS

Machine translation of WO-2018007719-A1 (Year: 2018).*
Machine translation of JP-2002205566-A (Year: 2002).*

*Primary Examiner* — Michael McCullough

(57) ABSTRACT

An overlaying protective apparatus for preventing liquids or debris from entering a vehicle gear shift mechanism for a vehicle comprising a console between a driver and adjacent passenger area with a movable gear shift stick rising from an opening or movable arrangement in a top region of the console is provided. The apparatus is configured to be added before or after market, without modification to the vehicle. In an example implementation, the protective apparatus comprising a fluid-impervious sheet of transparent material arranged to drape over the gear shift stick and extending to additionally cover at last part of the console so as to prevent liquids or debris from entering the vehicle gear shift mechanism through the opening or movable arrangement in the console. The protective apparatus can be configured as to permit the driver to see any labels, graphical markings, and visual indicators on the gear shift console.

11 Claims, 19 Drawing Sheets

Clear/transparent /fluid repellant material has accordion style folds.

Bonded edges for stability

(56) References Cited

U.S. PATENT DOCUMENTS

| | | | | |
|---|---|---|---|---|
| 3,748,923 A * | 7/1973 | Babbitt, Jr. | ............ | G05G 25/04 |
| | | | | 74/566 |
| 4,018,099 A * | 4/1977 | O'Brien | ................ | B60K 20/04 |
| | | | | 74/473.21 |
| 4,237,998 A * | 12/1980 | Matayoshi | ............ | B60K 20/04 |
| | | | | 180/89.14 |
| 4,735,596 A * | 4/1988 | Ukai | ........................ | F16J 3/041 |
| | | | | 277/636 |
| 4,791,826 A * | 12/1988 | Behrens | .................. | G05G 1/06 |
| | | | | 74/473.3 |
| 4,902,545 A * | 2/1990 | Ohta | .................. | F16H 59/0213 |
| | | | | 428/36.6 |
| 5,855,182 A * | 1/1999 | Kline | .................. | B60Q 1/1476 |
| | | | | 116/28.1 |
| 5,924,241 A * | 7/1999 | Hodge | .................. | A47G 7/085 |
| | | | | 47/72 |
| 6,098,336 A * | 8/2000 | Ferguson | ................ | A01G 5/06 |
| | | | | 206/423 |
| 6,142,192 A * | 11/2000 | Dickinson | ............. | B60C 25/147 |
| | | | | 141/114 |
| 6,158,301 A * | 12/2000 | Smart | ..................... | G05G 1/06 |
| | | | | 150/154 |
| 6,508,282 B2 * | 1/2003 | Garofalo | .............. | F17C 13/002 |
| | | | | 150/154 |
| 6,523,428 B2 * | 2/2003 | Kaji | ........................ | F16J 3/043 |
| | | | | 74/18.1 |
| 7,316,435 B2 * | 1/2008 | Leighton | ................ | A45C 11/00 |
| | | | | 150/154 |
| 7,650,849 B2 * | 1/2010 | Aso | ........................ | F16H 63/42 |
| | | | | 116/28.1 |
| 7,921,469 B2 * | 4/2011 | Ward, Jr. | ............... | A41B 13/10 |
| | | | | 2/48 |
| D758,205 S * | 6/2016 | Hirakata | ........................ | D9/711 |
| 2002/0000274 A1 * | 1/2002 | Ganski | ................. | B65F 1/1426 |
| | | | | 150/154 |
| 2004/0221678 A1 * | 11/2004 | Galway | .................. | B60Q 3/283 |
| | | | | 74/523 |
| 2005/0115970 A1 * | 6/2005 | Watson | ..................... | B65F 1/16 |
| | | | | 220/287 |
| 2007/0068895 A1 * | 3/2007 | Landstreet | ............. | B65D 23/08 |
| | | | | 215/386 |
| 2008/0163713 A1 * | 7/2008 | Hessler | .................. | G05G 25/04 |
| | | | | 74/473.3 |
| 2009/0241720 A1 * | 10/2009 | Kim | .................... | F16H 59/0213 |
| | | | | 74/491 |
| 2011/0247737 A1 * | 10/2011 | Foix Robert | .......... | A01G 13/10 |
| | | | | 150/154 |
| 2012/0080127 A1 * | 4/2012 | Fisher | ................. | A61M 5/1415 |
| | | | | 150/154 |
| 2014/0130947 A1 * | 5/2014 | PeCoy | .................... | A47G 33/04 |
| | | | | 150/154 |
| 2019/0024794 A1 * | 1/2019 | Fages | ..................... | B33Y 10/00 |
| 2020/0122650 A1 * | 4/2020 | Habert | ................ | B60R 13/0262 |
| 2020/0180925 A1 * | 6/2020 | Reynolds | ............... | G05G 25/04 |
| 2020/0224760 A1 * | 7/2020 | Clark | ..................... | B60K 20/04 |

* cited by examiner

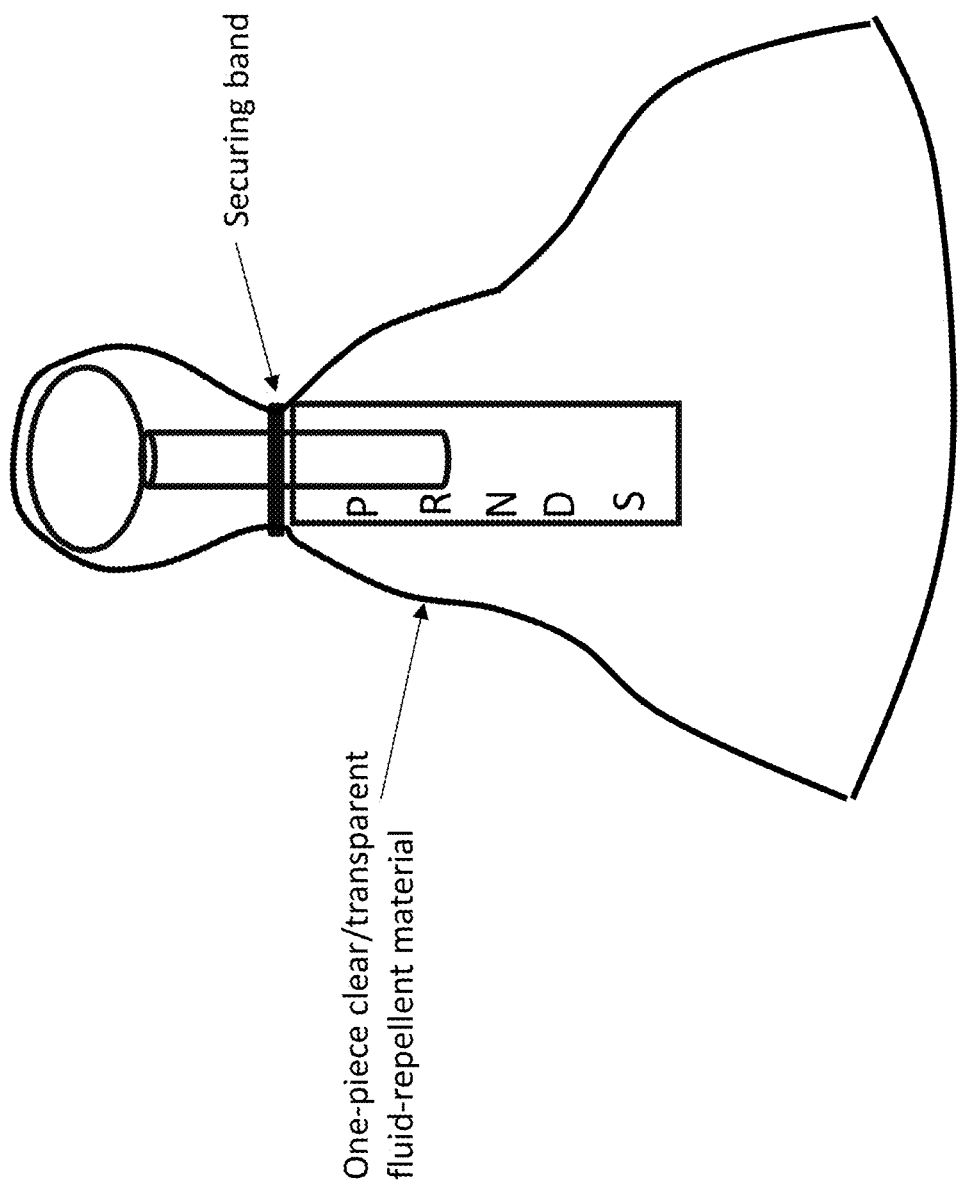

Transparent fluid repellant material with concentric circle bellows design.

CONSOLE GEAR-SHIFT SPILL GUARD FOR CAR, AUTOMOBILE, TRUCK, AND OTHER VEHICLES

STATEMENT OF RELATED CASES

This application claims priority from Provisional U.S. Patent Application 62/621,767, filed Jan. 25, 2018, and from Provisional U.S. Patent Application 62/760,828, filed Nov. 13, 2018, both of which are hereby incorporated by reference.

COPYRIGHT & TRADEMARK NOTICES

A portion of the disclosure of this patent document may contain material, which is subject to copyright protection. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

BACKGROUND OF THE INVENTION

Field of the Invention

The invention pertains to cars, automobiles, trucks, and other types of vehicles, and more specifically to spill guards that can be used to prevent mechanism and transmission damage from beverage spills into console-based gear shifts.

Overview of the Invention

Many cars, automobiles, trucks, and other types of vehicles provide console-based gearshifts that are arranged in a manner where beverages can be easily spilled and flow into the gearshift mechanism and even propagates into linkages and the drive train transmission. Beverage or other fluid spillage or spray into the gearshift area of the console often causes major repair expenses when leaking into the linkages or other mechanics.

The present invention provides protection from accidental spillage or spray into the console-based gear shift area. The present invention is arranged to divert or repel spilled fluid away from gearshift area to allow for use with napkins to dry out. The present invention is also arranged to be added at any time, before or after market, without modification to the vehicle. The present invention is additionally arranged to permit the driver of the vehicle to see any labels, graphical markings, and visual indicators on the gear shift console.

SUMMARY OF INNOVATION

For purposes of summarizing, certain aspects, advantages, and novel features are described herein. Not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In one aspect of the invention, protection is provided from accidental spillage or spray into the console-based gear shift area.

In another aspect of the invention, the protection provides one or more arrangements to divert or repel spilled fluid away from gear area to allow for use with napkins to dry out.

In another aspect of the invention, continuous covering arrangements are provided for covering at least the area of the console that supports the gear shift handle.

In another aspect of the invention, interlaced-finger arrangements are provided for covering at least the area of the console that supports the gear shift handle.

In another aspect of the invention, securing arrangements are provided for covering at least the area of the console that supports the gear shift handle.

In another aspect of the invention, accordion arrangements are provided for covering at least the area of the console that supports the gear shift handle.

In another aspect of the invention, the invention is configured to be added at any time, before or after market, without modification to the vehicle.

In another aspect of the invention, the invention is additionally arranged to permit the driver of the vehicle to see any labels, graphical markings, and visual indicators on the gear shift console.

In another aspect of the invention, an overlaying protective apparatus for preventing liquids or debris from entering an vehicle gear shift mechanism for an vehicle, the vehicle comprising a console located in an area between an area for a driver of the vehicle and an adjacent area for an optional passenger, the console comprising a movable gear shift stick rising from an opening or movable arrangement in a top region of the console, the movable gear shift stick affixed at its top with a gear shift handle, the protective apparatus comprising (1) fluid-impervious sheet of transparent material, the sheet arranged to drape over the gear shift handle and extending to additionally cover at last part of the console, and (2) a securing element arranged to secure the sheet to the gear shift stick, wherein the sheet is configured to be arranged when installed so as to cover at least the gear shift stick and the opening or movable arrangement in the console so as to prevent liquids or debris from entering the vehicle gear shift mechanism through the opening or movable arrangement in the console, and wherein the sheet is configured to when installed so as to allow the driver to see through the sheet to view the top region of the console.

In another aspect of the invention, the securing element comprises an elastic band.

In another aspect of the invention, the securing element comprises an adjustable belt.

In another aspect of the invention, the sheet comprises edges, the edges provided with an adhesive material.

In another aspect of the invention, the sheet comprises edges, and at least one of the edges is provided with weighting material.

In another aspect of the invention, the sheet comprises edges, the edges provided with visual embellishments.

In another aspect of the invention, the sheet comprises a hole through which gear shift handle can traverse through.

In another aspect of the invention, the sheet is arranged to cover the gear shift handle.

In another aspect of the invention, the sheet comprises flexible material.

In another aspect of the invention, an overlaying protective apparatus for preventing liquids or debris from entering an vehicle gear shift mechanism for an vehicle, the vehicle comprising a console located in an area between an area for a driver of the vehicle and an adjacent area for an optional passenger, the console comprising a movable gear shift stick rising from an opening or movable arrangement in a top region of the console, the movable gear shift stick affixed at its top with a gear shift handle, the protective apparatus comprising: (1) a fluid-impervious sheet of transparent material, the sheet adequately secured in position over the console and (2) an opening in the sheet through which gear shift handle can traverse through, wherein the sheet is configured to be arranged when installed so as to cover the opening or movable arrangement in the console so as to prevent liquids or debris from entering the vehicle gear shift mechanism through the opening or movable arrangement in the console, and wherein the sheet is configured to when installed so as to allow the driver to see through the sheet to view the top region of the console.

In another aspect of the invention, the opening comprises a pattern of cuts that create movable adjacent strips of material.

In another aspect of the invention, the opening comprises movable overlapping strips of material.

In another aspect of the invention, at least part of the sheet is configured to form a vertically-ascending bellows.

In another aspect of the invention, at least part of the sheet is configured to form a bellows comprising a concentric sequence of folds.

In another aspect of the invention, at least part of the sheet is configured to form a bellows comprising a linear sequence of folds.

In another aspect of the invention, at least part of the bellows has a collapsible and extendable accordion bellows structure.

In another aspect of the invention, at least part of the sheet is fitted with a securing element for securing the sheet into an operating position.

In another aspect of the invention, the securing element comprises an elastic band.

In another aspect of the invention, the securing element comprises an adjustable belt.

In another aspect of the invention, the securing element comprises a clip.

In another aspect of the invention, at least part of the sheet is fitted with an absorptive material.

In another aspect of the invention, configured for a console comprising two console sides, the sheet comprises extended portions for draping down each of the two console sides.

In another aspect of the invention, the sheet comprises edges, and wherein at least one of the edges is provided with weighting material.

In another aspect of the invention, configured for a gear shift arrangement requiring a zigzag operation of the gear shift stick, the zigzag operation comprising motion in at least two orthogonal directions, wherein the sheet comprises a centered bellows arrangement configured to accommodate movements of the gear shift stick comprising the at least two orthogonal directions.

In another aspect of the invention, securing approaches can in general include use of elastic material, Velcro™, fasteners, fastening arrangements, and adhering arrangements, including but not limited snaps, clips, buttons, laces, hooks, zippers, glues, etc.

BRIEF DESCRIPTION OF THE DRAWINGS

The above and other aspects, features, and advantages of the present invention will become more apparent upon consideration of the following description of preferred embodiments taken in conjunction with the accompanying drawing figures, wherein:

FIG. 2 depicts a first example embodiment of the invention draped over an example gear shift and handle arrangement.

DETAILED DESCRIPTION

In the following description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention.

In the following description, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Many cars, automobiles, trucks, and other types of vehicles provide console-based gear shift arrangements. Examples of such are depicted in FIGS. 1A-1D.

Activities of drivers and passengers include many kinds of situations where beverages, food, and other debris can fall on or into the console area on or near gear shift arrangements.

Figure 1A:
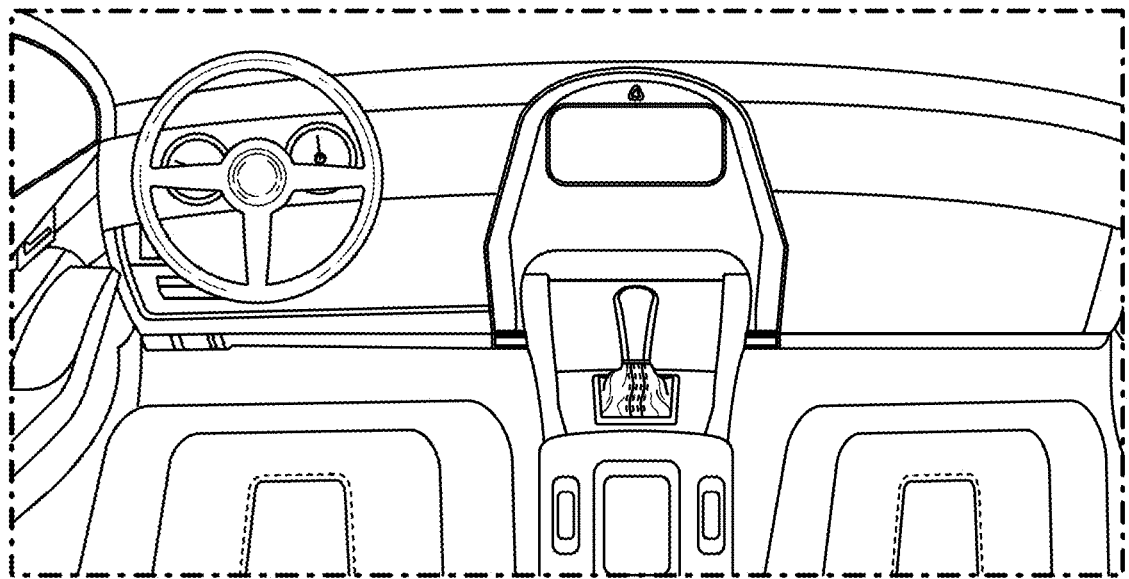
FIG. 1A depicts an example view of an example driver's area of an example vehicle interior featuring a console comprising a gear-shift arrangement where the gear-shift arrangement comprises a flexible-material arrangement to shield the mechanism below the console from incoming fluids and small debris.
Figure 1B:
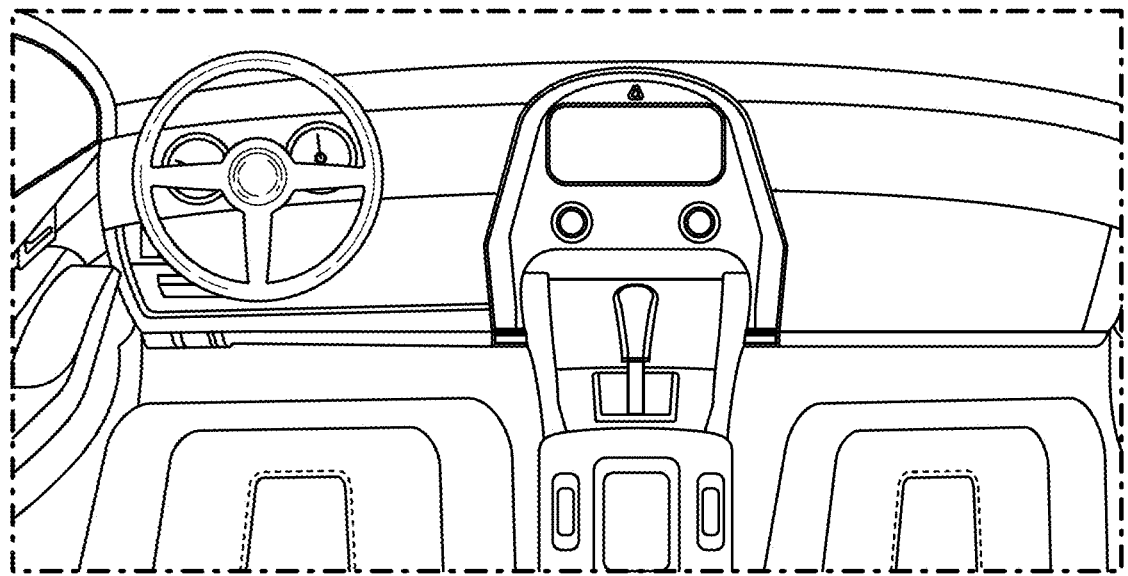
FIG. 1B depicts an example view of an example driver's area of another example vehicle interior also featuring a console comprising a gear-shift arrangement where there is no protection of the gear-shift arrangement to shield the mechanism below the console from incoming fluids and small debris.
Figure 1C:
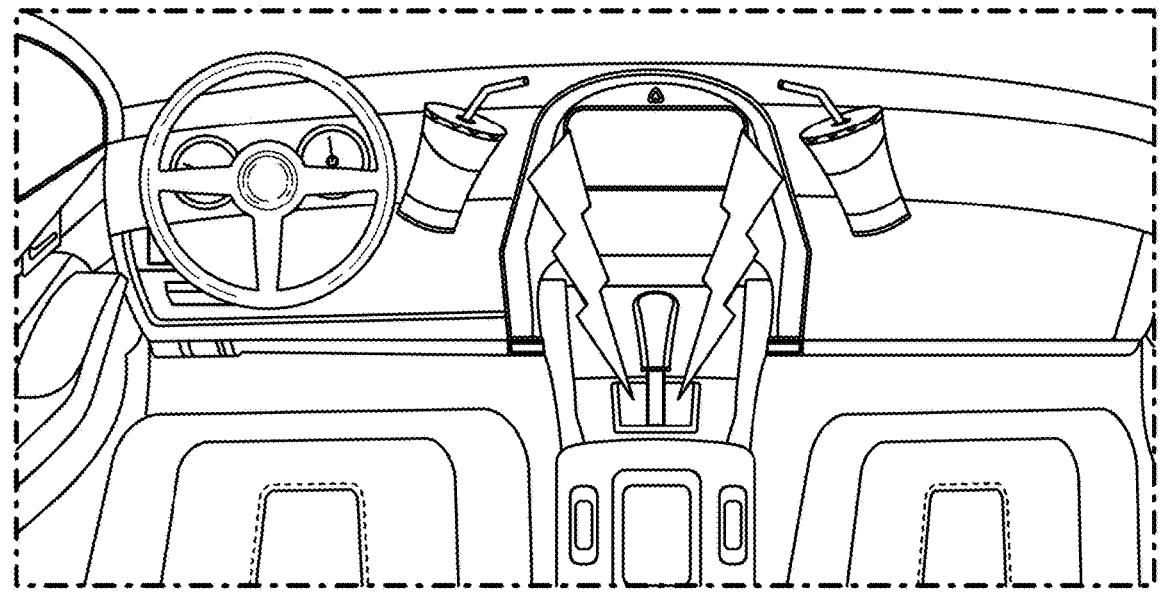
FIG. 1C depicts two examples of how spills of fluids can the enter at the base of gear-shift arrangement comprised by a console and propagate into the mechanism below the console.

As illustration, FIG. 1C depicts two examples of how spills of fluids can fall on or into the console area on or near gear shift arrangements. In the case depicted on the left side of the figure, a spill can fall directly on to the base of a gear shift arrangement. In the case depicted on the right side of the figure, a spill can fall near the base of a gear shift arrangement, but after contacting the console can subsequently flow over a console surface to the base of a gear shift arrangement.

Should the fluids be able to the enter at the base of gear-shift arrangement comprised by a console and propagate into the mechanism below the console, surprisingly-high expensive damages can result.

In anticipation of this, FIG. 1A depicts an example view of an example driver's area of an example vehicle interior featuring a console comprising a gear-shift arrangement where the manufacturer has configured the gear-shift arrangement to comprise a flexible-material arrangement to shield the mechanism below the console from incoming fluids and small debris.

However, the vast majority of cars, automobiles, trucks, and other types of vehicles having console-based gear shift arrangements are not protected in this manner. FIG. 1B depicts an example view of an example driver's area of another example vehicle interior also featuring a console comprising a gear-shift arrangement where there is no protection of the gear-shift arrangement to shield the mechanism below the console from incoming fluids and small debris. Further, such console-based gear shifts are often arranged in a manner where spilled beverages can easily flow into the gear shift mechanism or even interfaces with the drive train transmission, often causing the need for major repair expenses. Such incidents happen with astonishing frequency and can be financially and logistically devastating to struggling families, companies, and others.

What is clearly needed is a practical inexpensive solution to provide protection from accidental spillage or spray into unprotected console-based gear shift areas of a wide variety cars, automobiles, trucks, and other types of vehicles.

The present invention is directed through various embodiments provide protection from accidental spillage or spray into the unprotected console-based gear shift area for a wide variety cars, automobiles, trucks, and other types of vehicles. Aspects of the invention provide a variety of arrangements to divert or repel spilled fluid away from gear area and further to facilitate use of towels, napkins, sponges, or provided replaceable materials to clear fluid accumulations and dry affected areas.

The invention provides for various complete covering arrangements spanning the gear shift handle, gear shift shaft, and the console. Illustrative types of examples include:
1. Over-draping covering arrangements enveloping gear shift handle, gear shift shaft, and console,
2. Interlaced-finger console covering arrangements,
3. Concentric circle covering arrangements,
4. Bellows-style covering arrangements,
5. Accordion-style covering arrangements,
6. Adaptions and combinations of any two or more of these.

but many variations of these are possible and anticipated by the invention. For example, several illustrative embodiments are provided for each of the types of examples listed above in the correspondingly-numbered sections that follow.

Figure 1D:
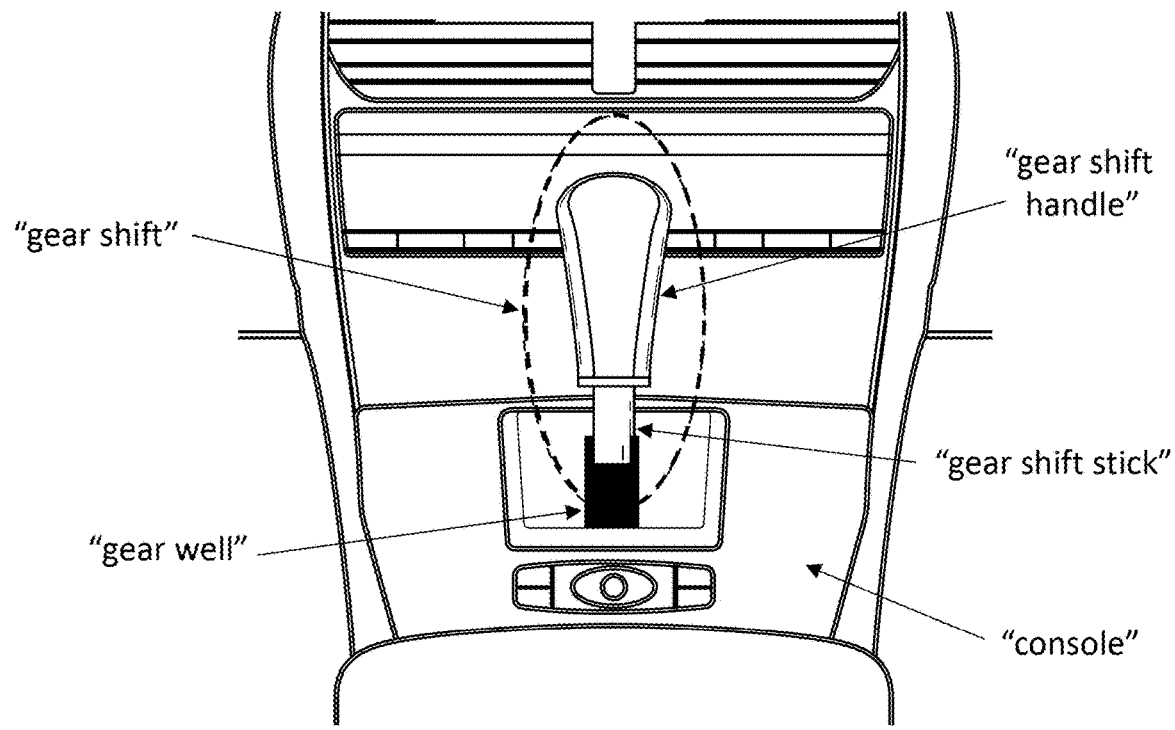
FIG. 1D depicts terms to be used in describing aspects of the invention.

Finally, in order to clarify meaning in the written descriptions that follow, FIG. 1D graphically depicts the terms "console," "gear well," gear shift," "gear shift handle," and "gear shift stick" that are to be used.

1. Example Complete Gear Shift Handle, Gear Shift Shaft, and Console Covering Arrangements In one family of embodiments, the invention provides for various complete covering arrangements spanning the gear shift handle, gear shift shaft, and the console. Such arrangements can be contoured or made form-fitting to various degrees, can be secured in various was via elastic, Velcro™, or other fasteners, fastening arrangements, and adhering arrangements, including but not limited snaps, clips, buttons, laces, hooks, zippers, glues, etc., can include weighting arrangements of various kinds to ensure adequate degrees of draping, and can include various other functional features or functional enhancements. Five illustrative examples are provided in this section:

Transparent draping wide-contour cover secured with a neck band,
Transparent draping wide-contour cover secured with a neck band and adhesive edges,
Transparent draping wide-contour cover secured with a neck band and weighted edges,
Transparent draping wide-contour cover secured with a neck band and weighted with weighted embellishing attachments,
Transparent draping creased-skirting cover secured with a belt around gear shift stick, but many variations, alternatives, or combinations of these are possible and anticipated by the invention. For example, some configurations it can be advantageous or necessary to include slits, openings, gaps, etc. in the sheet, for example for use with fasteners or securing arrangements.

1.1 Transparent Draping Wide-Contour Cover Secured with Neck Band

In this section, embodiments and implementations of the invention that comprise a transparent draping wide-contour cover that is secured with a neck band. In an example approach the invention is implemented as a one-piece transparent fluid-repellent material positioned over the gear handle and arranged to drape over a gear shift arrangement, spreading out over the console to prevent fluid spillage from flowing into the gear mechanism.

FIG. 2 depicts a first example embodiment of the invention draped over an example gear shift and handle arrangement. For example, such an embodiment can comprise a transparent fluid-impervious and/or fluid-repellant material sheet arranged as a smooth un-pleated skirt arranged to drape over the gear shift arrangement and to be secured, for example, via a securing band in turn comprising elastic material, or Velcro™, or other securing approaches such as those involving fasteners, fastening arrangements, and adhering arrangements, including but not limited snaps, clips, buttons, laces, hooks, zippers, glues, etc. In one approach, depicted in FIG. 2, the securing band can be positioned under or below the gear shift handle, perhaps under any gear depressor button located on the gear shift handle.

Although a straight lower edge is depicted, other types of edging are anticipated and provided for by the invention.

Figure 3:
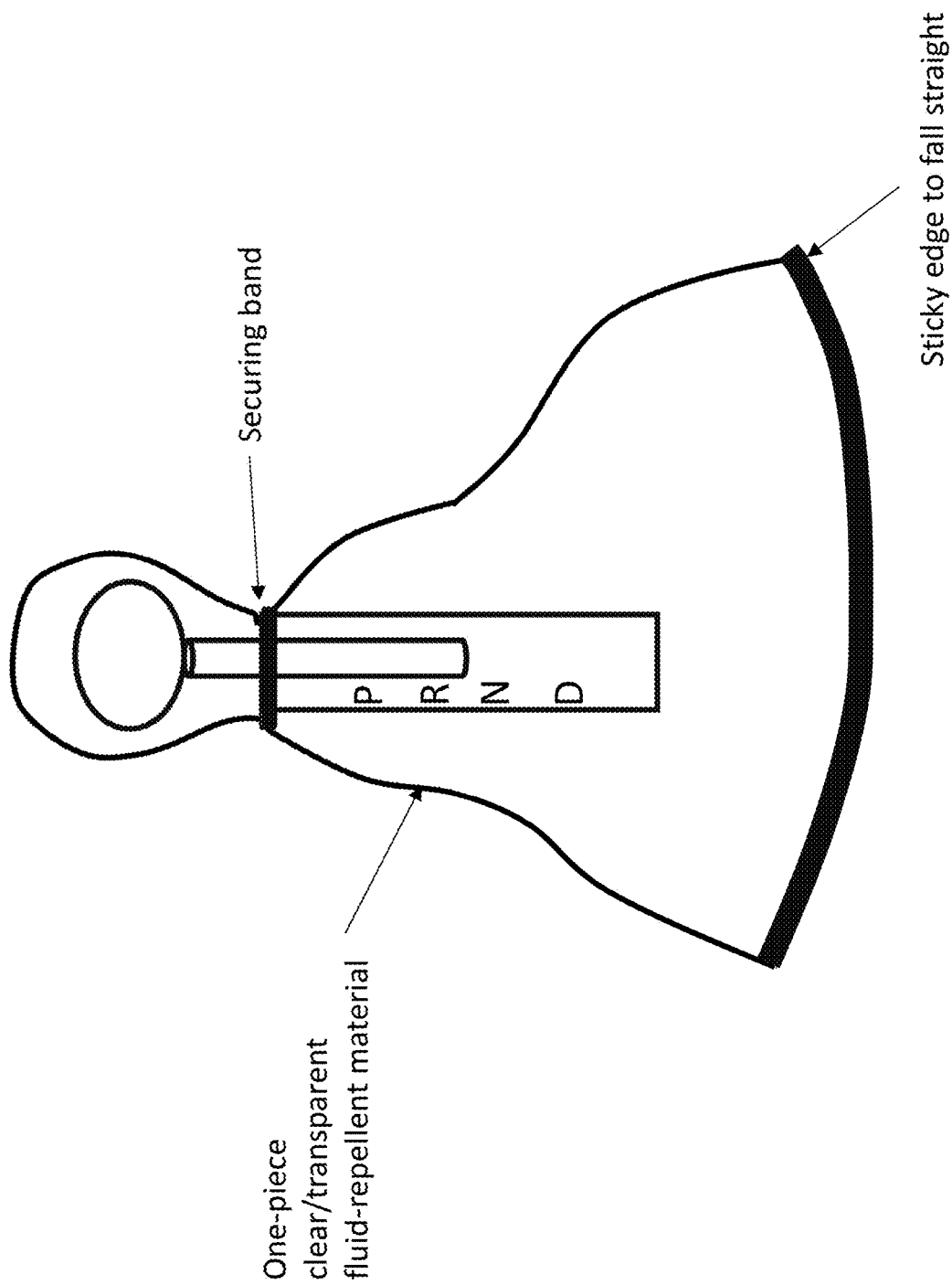
FIG. 3 depicts a first example embodiment of the invention, comprising a transparent fluid-impervious and/or fluid-repellant material arranged as a skirt arranged to drape over the gear shift arrangement and to be secured, for example, via a securing band or belt comprised of rubber, Velcro™, or other material, or other securing approaches such as those involving fasteners, fastening arrangements, and adhering arrangements, including but not limited snaps, clips, buttons, laces, hooks, zippers, glues, etc.

1.2 Transparent Draping Wide-Contour Cover Secured with Neck Band and Adhesive Edges Many addition features can be provided to the basic example arrangement described above in Section 1.1. For example, an implementation described in Section 1.1 can be additionally configured so that the lowest-draping edges of the skirt are provided with adhesive arrangement that can adhere/affix the edges of the skirt to the console. Depiction of such an example is provided in FIG. 3.

Figure 4:
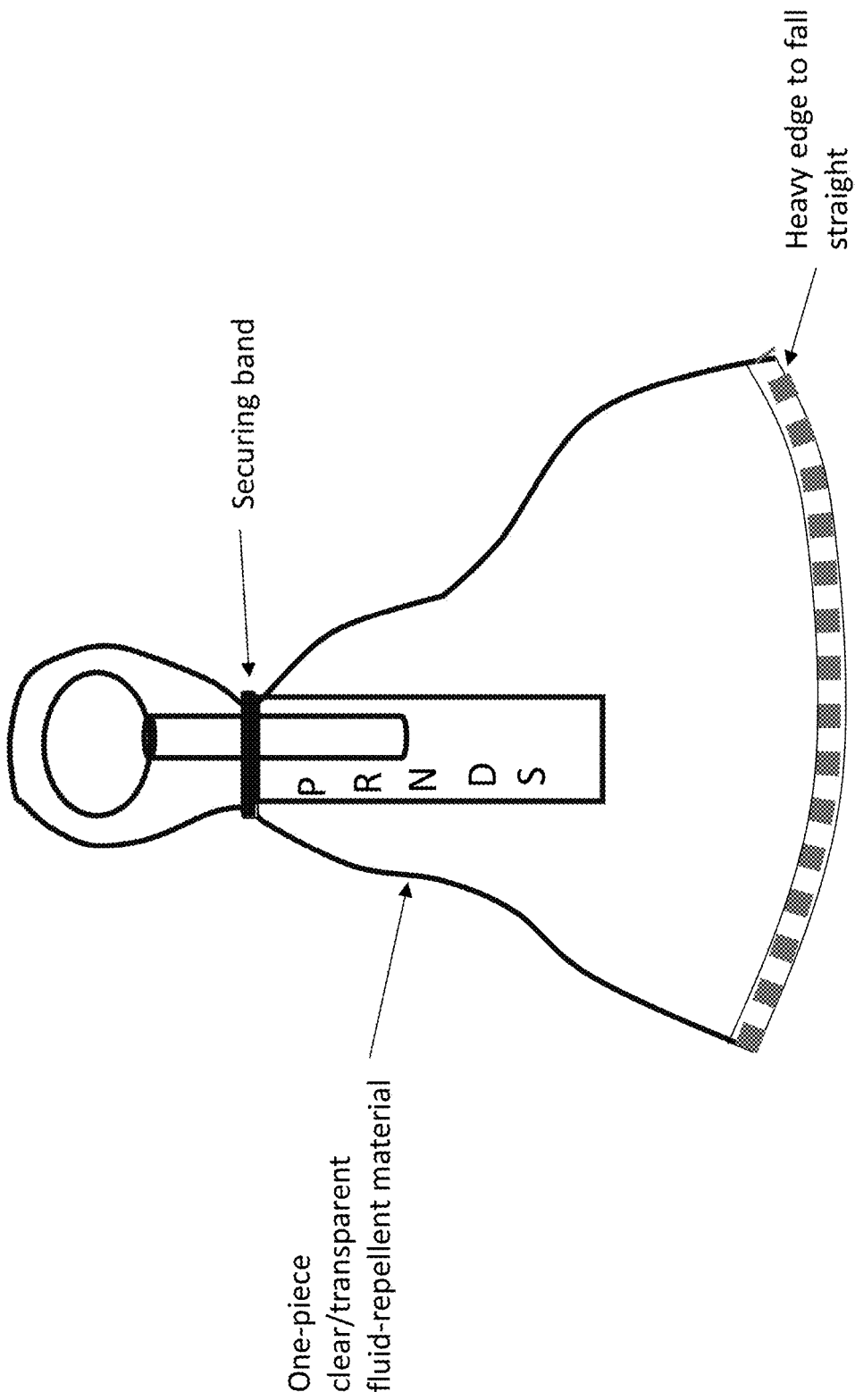
FIG. 4 depicts a second first example embodiment of the invention comprising a transparent fluid-impervious and/or fluid-repellant material going over the gear shift arrangement secured by a securing band comprising rubber or Velcro™, or other material, or other securing approaches such as those involving fasteners, fastening arrangements, and adhering arrangements, including but not limited snaps, clips, buttons, laces, hooks, zippers, glues, etc.

1.3 Transparent Draping Wide-Contour Cover Secured with Neck Band and Weighted Edges Other addition features can be provided to the basic example arrangement described above in Section 1.1. For example, an implementation described in Section 1.1 can be additionally configured so that the lowest-draping edges of the skirt are provided with weights or weighting material. The pull of gravity on these weights or weighting material assist in tending to keep the skirt draped somewhat straightly and uniformly spread of over the console area. Depiction of such an example is provided in FIG. 4.

Figure 5:
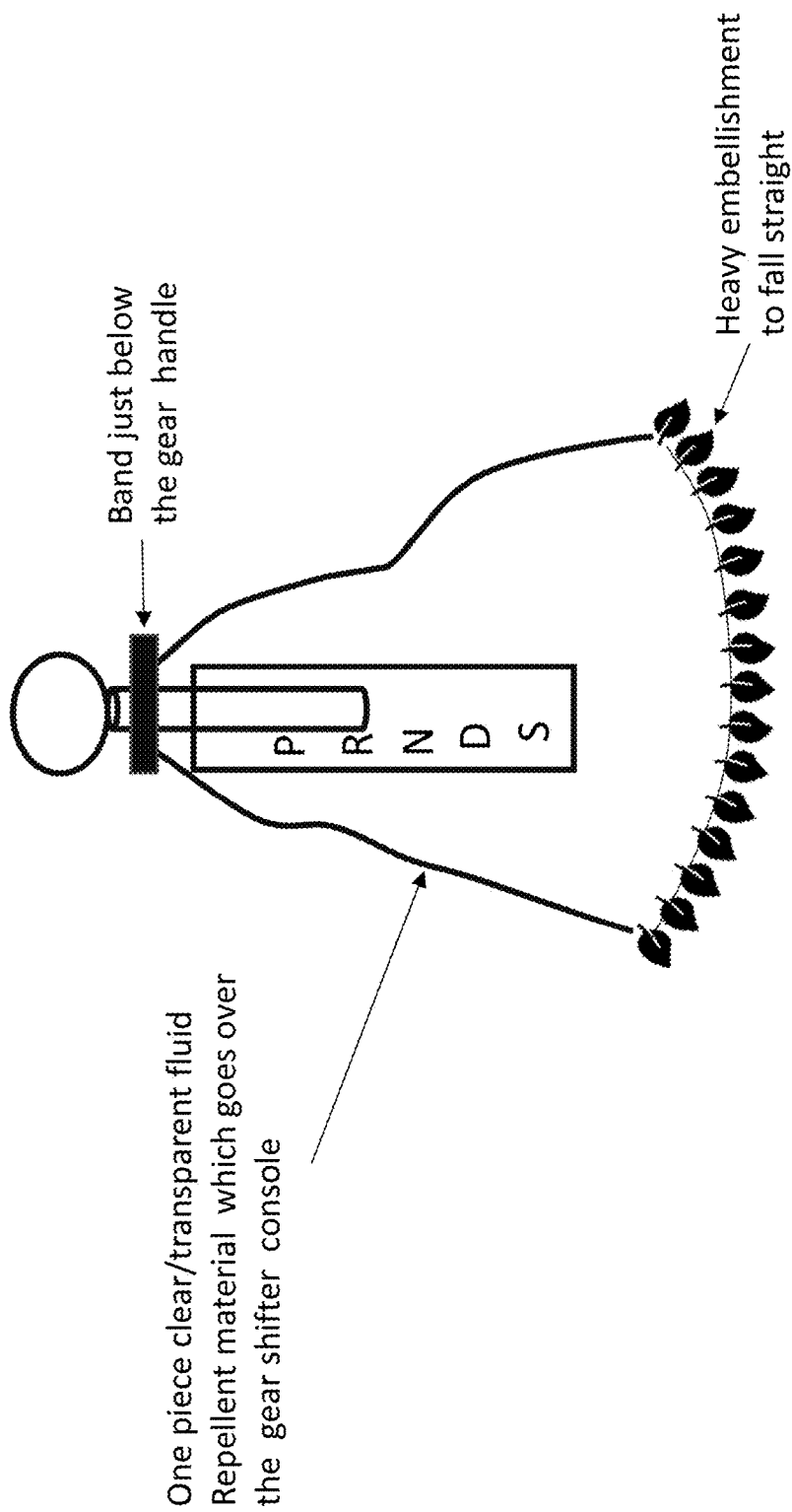
FIG. 5 depicts a third first example embodiment of the invention comprising a transparent fluid-impervious and/or fluid-repellant material going over the gear shift arrangement secured by a securing band comprising rubber or Velcro™, or other material, or other securing approaches such as those involving fasteners, fastening arrangements, and adhering arrangements, including but not limited snaps, clips, buttons, laces, hooks, zippers, glues, etc.

1.4 Transparent Cover Draping Wide-Contour Secured with Neck Band and Weighted Embellishing Attachments Yet other addition features can be provided to the basic example arrangement described above in Section 1.1. For example, an implementation described in Section 1.1 can be additionally configured so that the lowest-draping edges of the skirt are provided with weighted embellishing and/or ornamental attachments. The pull of gravity on these weighting attachments assist in tending to keep the skirt draped somewhat straightly and uniformly spread of over the console area. Depiction of such an example is provided in FIG. 5.

A wide variety of types of embellishing attachments can be used, for example beads, charms, or organic material.

Figure 6:
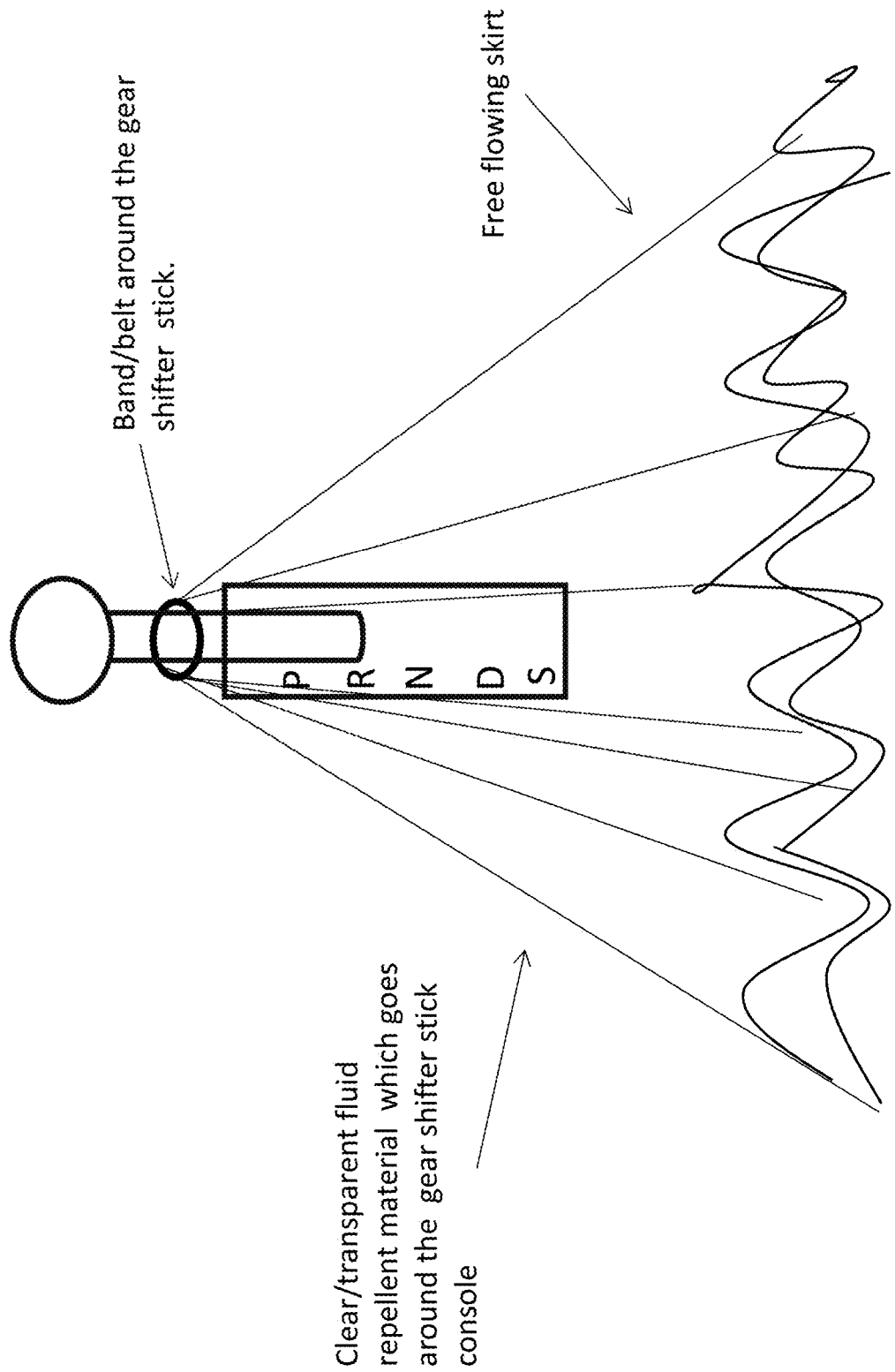
FIG. 6 depicts an example arrangement wherein the transparent fluid-impervious and/or fluid-repellant material is gathered, constrained, and/or tied by a band or belt (comprising for example rubber, Velcro™, or other material, or other securing approaches such as those involving fasteners, fastening arrangements, and adhering arrangements, including but not limited snaps, clips, buttons, laces, hooks, zippers, glues, etc) under or below the gear depressor button. In one implementation, the skirt flares out covering the gear shift area.

1.5 Transparent Cover Draping Creased-Skirting Secured with Belt Around Gear Shift Stick The invention also provides for a wider variety of variation on the basic example arrangement described above in Section 1.1. As one example of such a wider variation, FIG. 6 depicts an example wherein the transparent fluid-impervious and/or fluid-repellant material is gathered, constrained, or otherwise creased or pleated, so that a pleated skirt flares out covering the gear shift console area but does not cover the gear shift handle.

1.6 Summary

In an aspect of the invention, an overlaying protective apparatus for preventing liquids or debris from entering an vehicle gear shift mechanism for an vehicle, the vehicle comprising a console located in an area between an area for a driver of the vehicle and an adjacent area for an optional passenger, the console comprising a movable gear shift stick rising from an opening or movable arrangement in a top region of the console, the movable gear shift stick affixed at its top with a gear shift handle, the protective apparatus comprising (1) fluid-impervious sheet of transparent material, the sheet arranged to drape over the gear shift handle and extending to additionally cover at last part of the console, and (2) a securing element arranged to secure the sheet to the gear shift stick, wherein the sheet is configured to be arranged when installed so as to cover at least the gear shift stick and the opening or movable arrangement in the console so as to prevent liquids or debris from entering the vehicle gear shift mechanism through the opening or movable arrangement in the console, and wherein the sheet is configured to when installed so as to allow the driver to see through the sheet to view the top region of the console.

In another aspect of the invention, the securing element comprises an elastic band. In another aspect of the invention, the securing element comprises an adjustable belt. a securing band in turn comprising elastic material. Securing approaches can in general include use of elastic material, Velcro™, fasteners, fastening arrangements, and adhering arrangements, including but not limited snaps, clips, buttons, laces, hooks, zippers, glues, etc. In some configurations it can also be advantageous or necessary to include slits, openings, gaps, etc. in the sheet, for example for use with fasteners or securing arrangements.

In another aspect of the invention, the sheet comprises edges, the edges provided with an adhesive material. In another aspect of the invention, the sheet comprises edges, and at least one of the edges is provided with weighting material. securing band in turn comprising elastic material, or Velcro™. Other securing approaches can include use of fasteners, fastening arrangements, and adhering arrangements, including but not limited snaps, clips, buttons, laces, hooks, zippers, glues, etc.

In another aspect of the invention, the sheet comprises edges, the edges provided with visual embellishments.

In another aspect of the invention, the sheet comprises a hole through which gear shift handle can traverse through.

In another aspect of the invention, the sheet is arranged to cover the gear shift handle.

In another aspect of the invention, the sheet comprises flexible material.

2. Example Interlaced-Finger Console-Only Covering Arrangements

In this section, embodiments and implementations of the invention that comprise one or more of various types of interlaced-finger arrangements. Three illustrative examples are provided in this section:

Transparent cover with alternating interleaving flaps,
Transparent cover with overlapping rectangular flaps,
Transparent cover with overlapping non-rectangular wings, but many variations, alternatives, or combinations of these are possible and anticipated by the invention. Further, in some configurations it can also be advantageous or necessary to include slits, openings, gaps, etc. in the sheet, for example for use with fasteners or securing arrangements.

2.1 Transparent Cover with Alternating Interleaving Flaps

Figure 7:
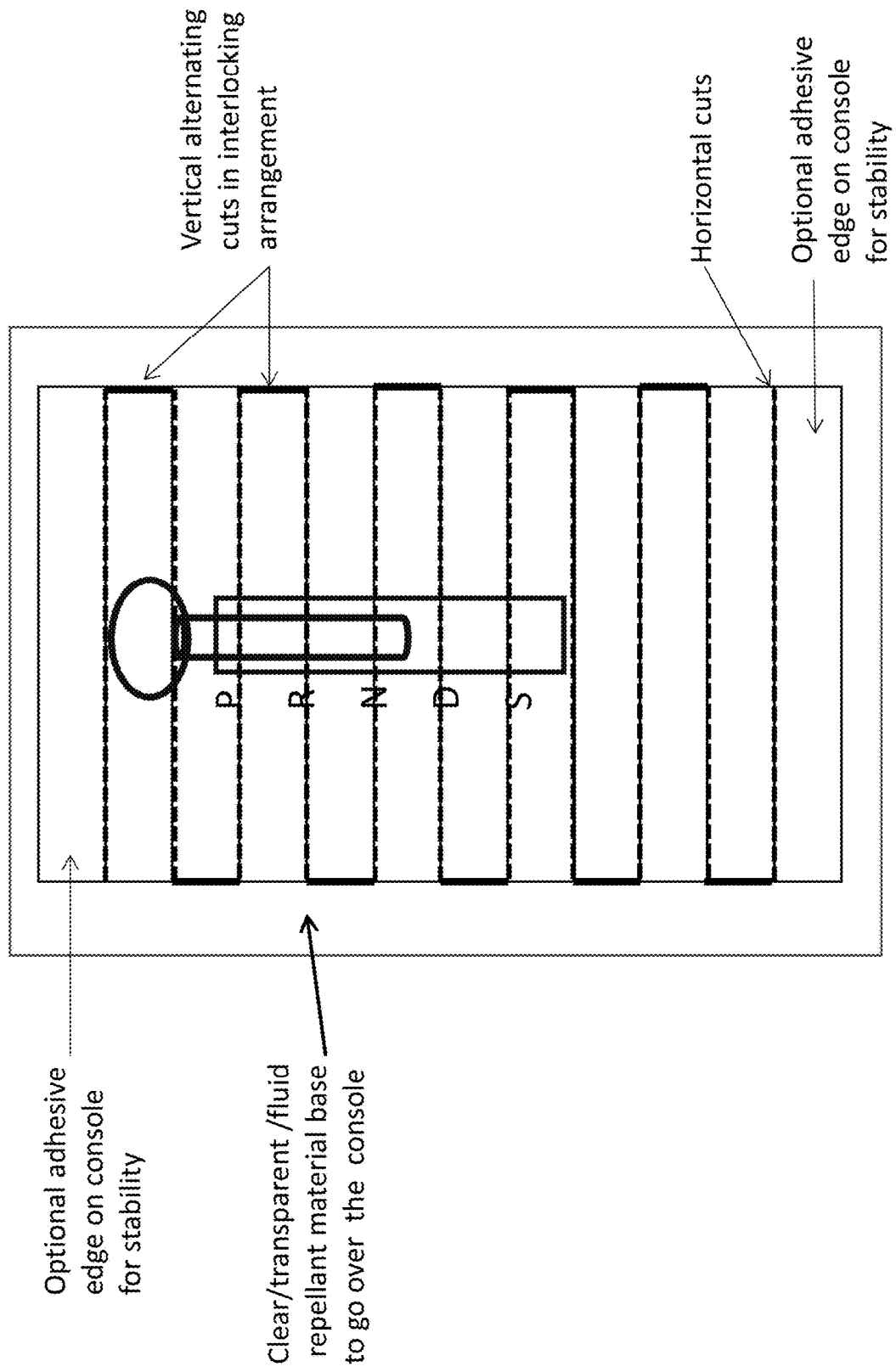
FIG. 7 depicts a forth first example embodiment of the invention comprising a transparent fluid-impervious and/or fluid-repellant material going over the gear shift arrangement where the area of gear movement is covered by alternate wings or flaps to repel the fluid away from penetrating into linkage mechanisms or the gear box.

FIG. 7 depicts an example embodiment of the invention comprising a sheet of transparent fluid-impervious and/or fluid-repellant material going over the gear shift arrangement where the area of gear movement is covered by alternating interleaved flaps. The horizontal ends can be secured to the console for stability.

For example, an implementation can comprise a sequence of horizontally-aligned slits in the console cover form interleaved flaps, and the interleaving can be implemented by alternating the side where vertically-aligned slits are applied. The resulting alternating interleaving flaps can be configured so that the edges of the flaps meet in a manner configured to repel any spilled fluid and keep it from penetrating into mechanisms below the console.

The gear shift stick moves freely by alternate cuts lifting up allowing the gear shifter stick to move among the alternate cuts/fingers, which separate as the gear shift stick moves towards them and collapse to close behind the gear shift stick as the gear shift stick moves away from them; hence helping to prevent the fluid or debris from entering the console.

Regarding example physical scale, the base cover could be 3" to 6" in width and 3" to 8" in length.

Additionally, this example embodiment can also be configured to include adhesive regions, for example in (but not restricted to) edge areas, so as to removably adhere to the console to provide positional stability.

2.2 Transparent Cover with Overlapping Rectangular Flaps

Figure 8:
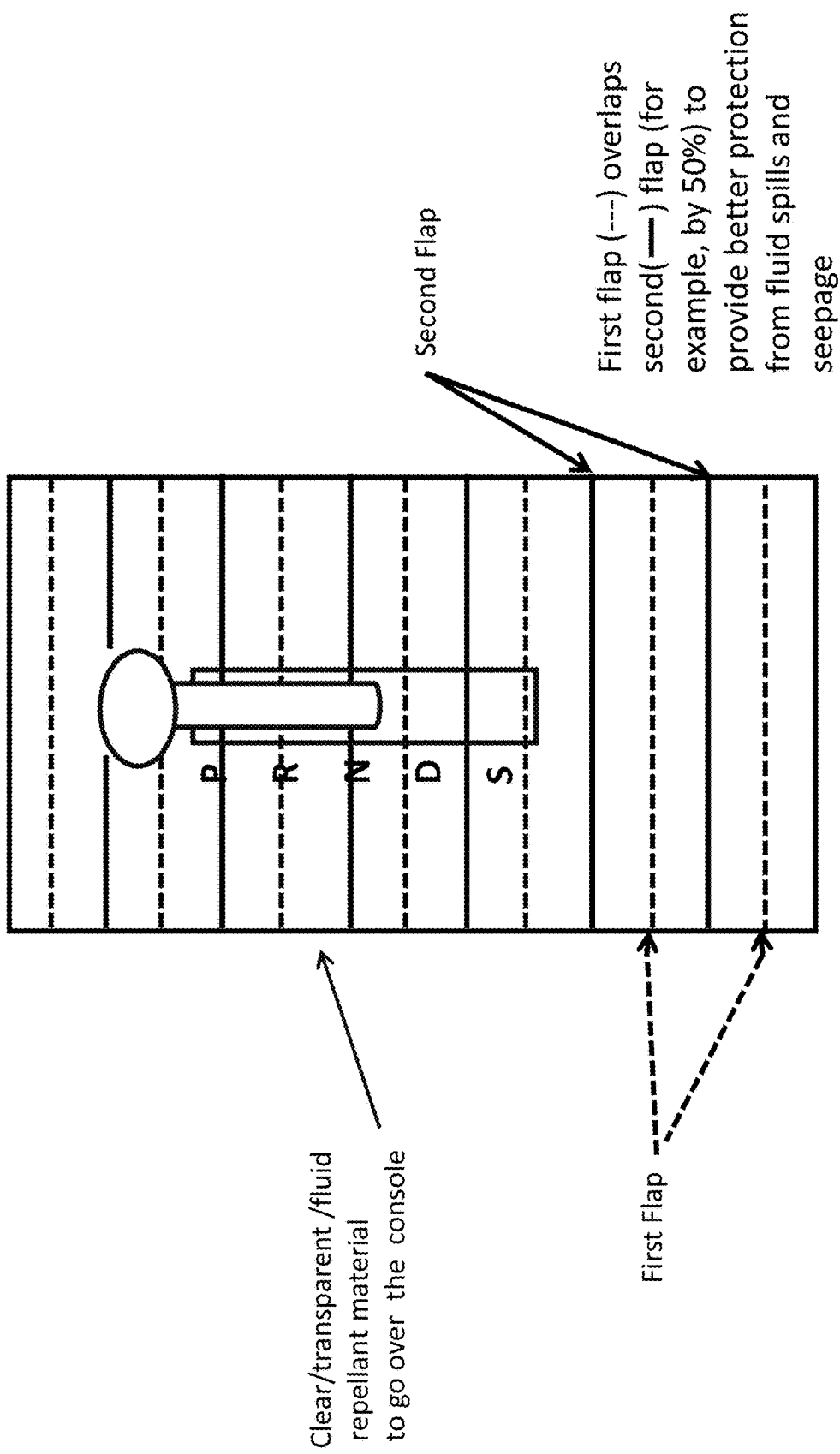
FIG. 8 depicts a fifth first example embodiment of the invention comprising a transparent fluid-impervious and/or fluid-repellant material going over the gear shift arrangement where the area of gear movement is covered by alternate wings or flaps overlapping by, for example, 50% to repel the fluid away from penetrating into linkage mechanisms or the gear box.

FIG. 8 depicts another example embodiment of the invention comprising a sheet of transparent fluid-repelling material positioned over the gear shift arrangement where the area of gear movement is covered by alternating flaps that are configured to overlap over one another in a manner configured to repel any spilled fluid and keep it from penetrating into mechanisms below the console.

For example, a 50% overlap can be used to create a "seal" between contacting flaps configured to repel any spilled fluid and keep it from penetrating into mechanisms below the console.

Regarding example physical scale, the base cover could be 3" to 6" in width and 3" to 8" in length.

Additionally, this example embodiment can also be configured to include adhesive regions so as to removably adhere to the console to provide positional stability.

In another aspect of the invention, at least part of the sheet is fitted with a securing element for securing the sheet into an operating position.

In another aspect of the invention, the securing element comprises an elastic band.

In another aspect of the invention, the securing element comprises an adjustable belt.

In another aspect of the invention, the securing element comprises a clip.

In another aspect of the invention, at least part of the sheet is fitted with an absorptive material.

2.3 Transparent Cover with Overlapping Non-Rectangular Wings

As a variation on the example embodiment of FIG. 8, alternating overlapping non-rectangular "wings" can be used in place of rectangular overlapping flaps. The overlap can be used to create a "seal" between contacting flaps configured to repel any spilled fluid and keep it from penetrating into mechanisms below the console.

As an example of physical scale, the base cover could be 3" to 6" in width and 3" to 8" in length.

Additionally, this example embodiment can also be configured to include adhesive regions so as to removably adhere to the console to provide positional stability.

In another aspect of the invention, at least part of the sheet is fitted with a securing element for securing the sheet into an operating position.

In another aspect of the invention, the securing element comprises an elastic band.

In another aspect of the invention, the securing element comprises an adjustable belt.

In another aspect of the invention, the securing element comprises a clip.

In another aspect of the invention, at least part of the sheet is fitted with an absorptive material.

2.4 Summary

In another aspect of the invention, an overlaying protective apparatus for preventing liquids or debris from entering an vehicle gear shift mechanism for an vehicle, the vehicle comprising a console located in an area between an area for a driver of the vehicle and an adjacent area for an optional passenger, the console comprising a movable gear shift stick rising from an opening or movable arrangement in a top region of the console, the movable gear shift stick affixed at its top with a gear shift handle, the protective apparatus comprising: (1) a fluid-impervious sheet of transparent material, the sheet adequately secured in position over the console and (2) an opening in the sheet through which gear shift handle can traverse through, wherein the sheet is configured to be arranged when installed so as to cover the opening or movable arrangement in the console so as to prevent liquids or debris from entering the vehicle gear shift mechanism through the opening or movable arrangement in the console, and wherein the sheet is configured to when installed so as to allow the driver to see through the sheet to view the top region of the console.

In another aspect of the invention, the opening comprises a pattern of cuts that create movable adjacent strips of material.

In another aspect of the invention, the opening comprises movable overlapping strips of material.

Securing approaches can in general include use of elastic material, Velcro™, fasteners, fastening arrangements, and adhering arrangements, including but not limited snaps, clips, buttons, laces, hooks, zippers, glues, etc. In some configurations it can also be advantageous or necessary to include slits, openings, gaps, etc. in the sheet, for example for use with fasteners or securing arrangements.

3. Example Concentric Rectangular Bellows Arrangements

The invention additionally provides for concentric rectangular bellows arrangements that for example can be configured to slip over the gear handle. One ascending rectangular bellows arrangement example embodiment is provided here, but many variations are possible and anticipated. As an example variation, a wave pattern structure can be employed instead of an ascending rectangular structure. As another example variation, other concentric polygonal shapes can be used in the place of concentric rectangular shapes.

Figure 9C:
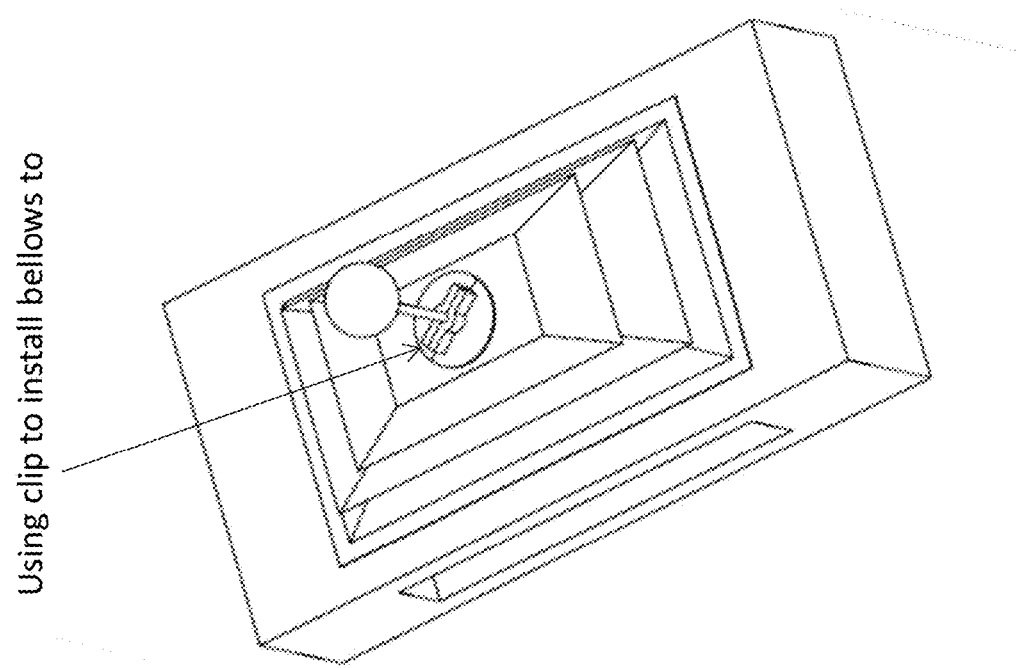
FIG. 9C depicts an example use of such a clip to secure a bellows embodiment to the gear shift stick.
Figure 9B:
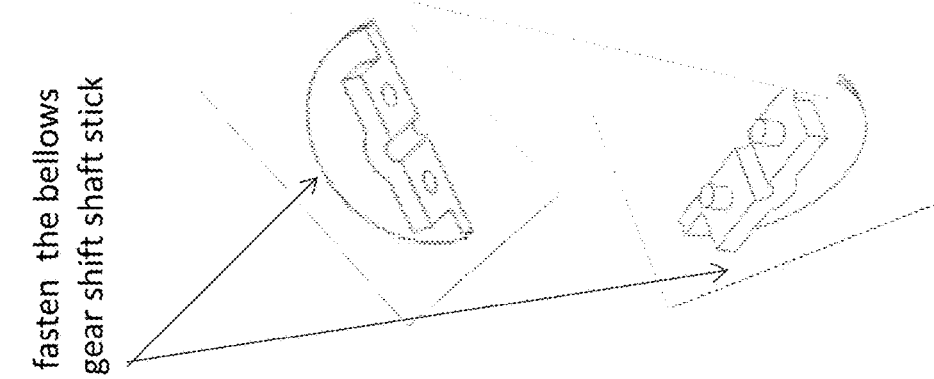
FIG. 9B depicts an example two-part clip implementation for example for use on top on the bellows for easy securing of a bellows to the gear shift stick at installation of the invention.
Figure 9A:
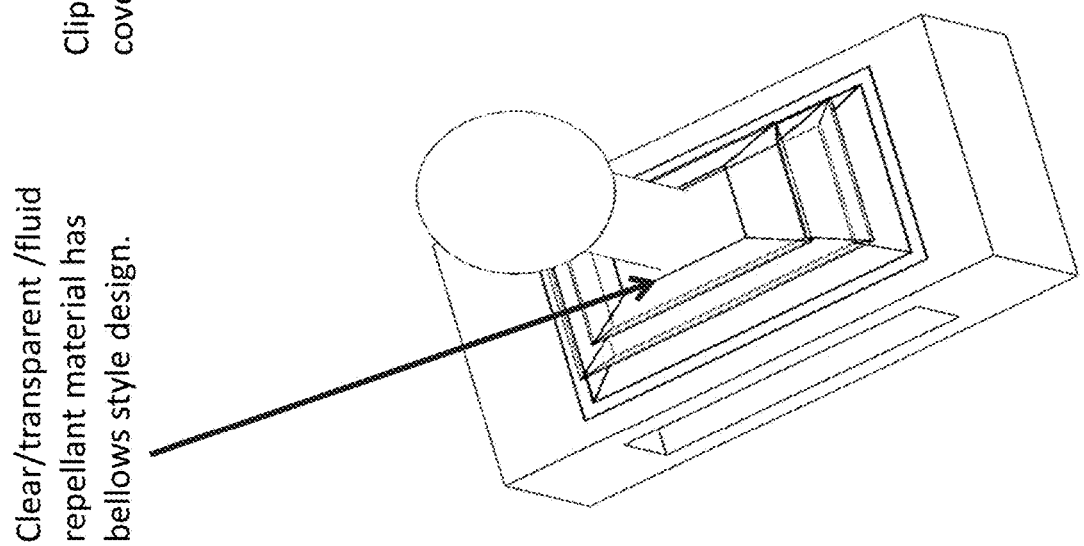
FIG. 9A depicts an arrangement comprising of Bellows high ridges of a highly absorbent, fluid-impervious, and/or fluid-repellant transparent material rendered in a rectangular or center console shape structure, to compress and expansively stretch as imposed by the position and movement of the gear shift handle. It has clips on the top for easy installation.

FIG. 9A depicts an example arrangement comprising of an ascending rectangular bellows comprising high ridges of a transparent fluid-impervious and/or fluidic-repellant material rendered in a rectangular or center console shape structure, to compress and expansively stretch as imposed by the position and movement of the gear shift handle. As an example of physical scale, the ascending rectangular bellows could be ⅟16" to 5" in height.

Such an arrangement can be configured to be positioned over a gear shift stick, deflecting the fluid from center opening. The bellows provide flexible leeway to stretch and contract in all directions.

Such an arrangement can be comprised to slip over the gear handle.

In another aspect of the invention, at least part of the sheet is fitted with a securing element for securing the sheet into an operating position. In an example implementation, the arrangement can comprise at least one clip arrangement, for example for use on top on the bellows embodiment for easy securing of a bellows embodiment to the gear shift stick at installation of the invention. An example of a two-part implementation of such a clip is depicted in FIG. 9B.

In an example implementation, the arrangement can comprise a clip to fasten it to the gear shaft. An example use of such a clip to secure the bellows embodiment to the gear shift stick is depicted in FIG. 9C.

In another example implementation, the securing element comprises an elastic band. In yet another example implementation, the securing element comprises an adjustable belt. Securing approaches can in general include use of elastic material, Velcro™, fasteners, fastening arrangements, and adhering arrangements, including but not limited snaps, clips, buttons, laces, hooks, zippers, glues, etc.

In another aspect of the invention, a highly fluid-absorbent transparent material can be used instead of the fluid-impervious and/or fluid-repellant transparent material described above. In one implementation, a fluid-impervious and/or fluid-repellant transparent material can be positioned beneath the fluid-absorbent transparent material to prevent any spilled fluid and keep it from penetrating into mechanisms below the console.

Additionally, this example embodiment can also be configured to include adhesive regions so as to removably adhere to the console to provide positional stability.

In another aspect of the invention, at least part of the sheet is configured to form a vertically-ascending bellows.

In another aspect of the invention, at least part of the sheet is configured to form a bellows comprising a concentric sequence of folds.

Further, in some configurations it can also be advantageous or necessary to include slits, openings, gaps, etc. in the sheet, for example for use with fasteners or securing arrangements.

4. Example Concentric Circular Wave-Pattern Bellows Arrangements

The invention additionally provides for baffles and related implementations comprising various concentric circular wave-pattern arrangements in the sheet of protective material that for example can be configured to slip over the gear handle. Two examples are provided here, Concentric circular wave-pattern bellows with low-profile edges, Concentric circular wave-pattern bellows with high-profile edges, but many variations, alternatives, or combinations of these are possible and anticipated by the invention. As an example variation, an ascending bellows structure can be employed instead of a wave pattern bellows structure. As another example, other concentric curved shapes can be used in the place of circular shapes.

Securing approaches can in general include use of elastic material, Velcro™, fasteners, fastening arrangements, and adhering arrangements, including but not limited snaps, clips, buttons, laces, hooks, zippers, glues, etc. Further, in some configurations it can also be advantageous or necessary to include slits, openings, gaps, etc. in the sheet, for example for use with fasteners or securing arrangements.

In another aspect of the invention, at least part of the sheet is fitted with a securing element for securing the sheet into an operating position. In an example implementation, the securing element comprises an elastic band. In another example implementation, the securing element comprises an adjustable belt. In yet another example implementation, the securing element comprises a clip.

In another aspect of the invention, a highly fluid-absorbent transparent material can be used instead of the fluid-impervious and/or fluid-repellant transparent material described above. In one implementation, a fluid-impervious and/or fluid-repellant transparent material can be positioned beneath the fluid-absorbent transparent material to prevent any spilled fluid and keep it from penetrating into mechanisms below the console.

4.1 Concentric Circular Wave-Pattern Bellows with Low-Profile Edges

Figure 10:
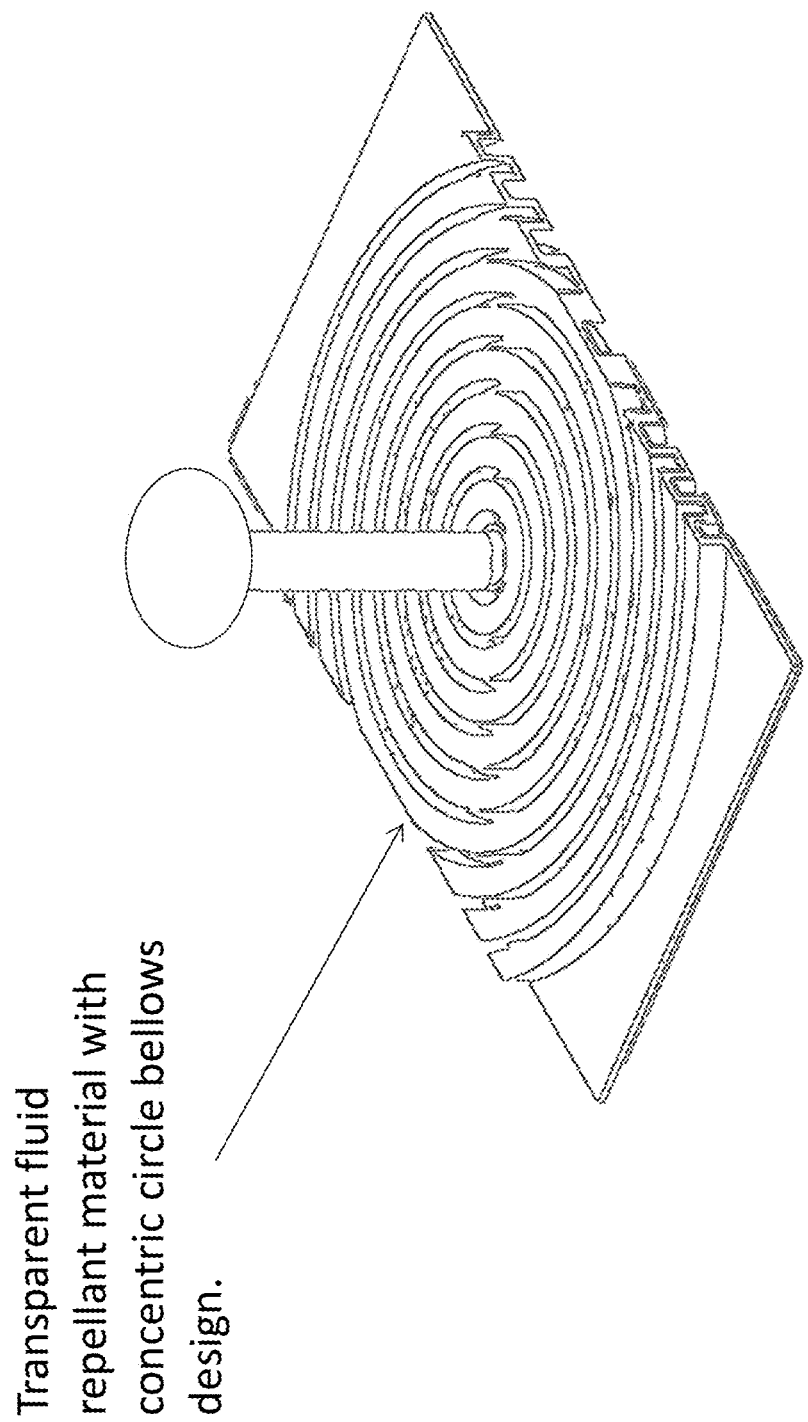
FIG. 10 depicts an arrangement comprising of concentric circles of a highly absorbent, fluid-impervious, and/or fluid-repellant transparent material rendered in a circular high and low structure, to compress and expansively stretch as imposed by the position and movement of the gear shift handle.

FIG. 10 depicts an example bellows arrangement comprising of concentric circular wave pattern structure comprising a fluid-impervious and/or fluid-repellant transparent material rendered in a circular high and low structure, to compress and expansively stretch as imposed by the position and movement of the gear shift handle.

In another aspect of the invention, at least part of the sheet is fitted with an absorptive material.

In an example implementation, a transparent fluid-impervious and/or fluidic-repellant material can be configured to have concentric circle bellow arrangement providing a seal in the center of the with the gear shift stick, catching the fluid in the circular gap. The circular gap gives moving leeway to stretch and contract in all directions. In an implementation, one or more edges of the fluid-impervious and/or fluid-repellant transparent material can be bonded for positional stability.

As an example of physical scale, the height of the concentric circular bellows could be ⅟16" or so. As another example of physical scale, the base cover could be 3" to 6" in width and 3" to 8" in length.

In an example implementation, the arrangement can comprise a clip to fasten it to the gear shaft, such as the example depicted in FIG. 9C.

Additionally, this example embodiment can also be configured to include adhesive regions so as to removably adhere to the console to provide positional stability.

4.2 Concentric Circles Wave-Pattern Bellows with High-Profile Edges

Figure 11:
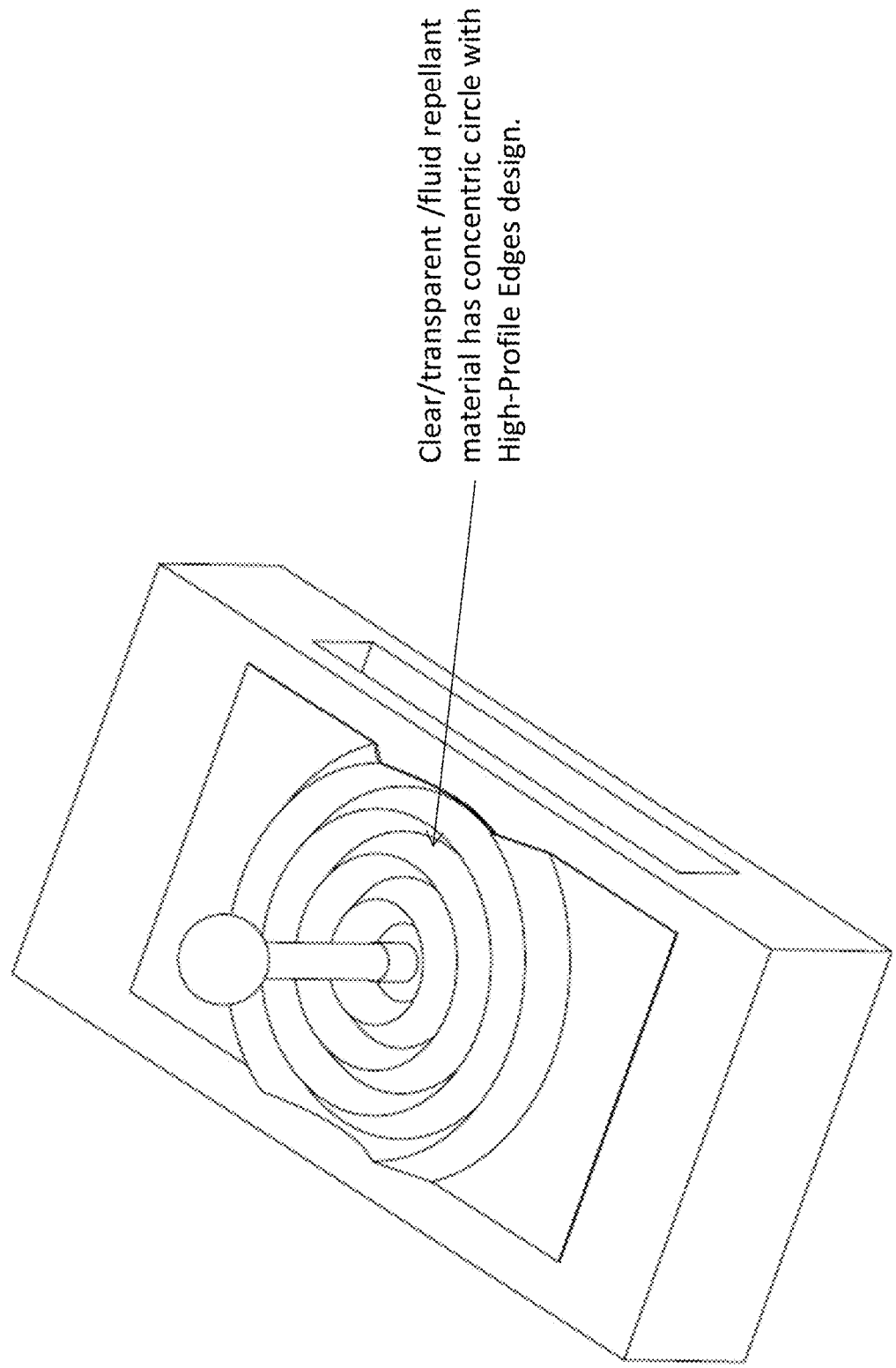
FIG. 11 depicts an arrangement comprising of concentric circular high ridges of a highly absorbent, fluid-impervious, and/or fluid-repellant transparent material rendered in a circular high ridges and low structure, to compress and expansively stretch as imposed by the position and movement of the gear shift handle.

FIG. 11 depicts another example variation on the example depicted to FIG. 10 wherein the concentric circular comprises higher ridges than those of the example implementation described in Section 4.1. As an example of physical scale of the higher concentric circular bellows, the height of the concentric circular bellows could be greater than ⅟16" or so, and for example could be as high as 3" or so.

As another example of physical scale, the base cover could be 3" to 6" in width and 3" to 8" in length.

Additionally, this example embodiment can also be configured to include adhesive regions so as to removably adhere to the console to provide positional stability.

4.3 Summary

In an aspect of the invention, at least part of the sheet is configured to form a vertically-ascending bellows.

In another aspect of the invention, at least part of the sheet is configured to form a bellows comprising a concentric sequence of folds.

In another aspect of the invention, at least part of the sheet is fitted with a securing element for securing the sheet into an operating position. In an example implementation, the securing element comprises an elastic band. In another example implementation, the securing element comprises an adjustable belt. In yet another example implementation, the securing element comprises a clip. Securing approaches can in general include use of elastic material, Velcro™, fasteners, fastening arrangements, and adhering arrangements, including but not limited snaps, clips, buttons, laces, hooks, zippers, glues, etc. Further, in some configurations it can also be advantageous or necessary to include slits, openings, gaps, etc. in the sheet, for example for use with fasteners or securing arrangements.

In another aspect of the invention, at least part of the sheet is fitted with an absorptive material.

5. Example Accordion Arrangements for use in Gear Well

The invention provides for various accordion arrangements. Six examples are provided here Accordion-style cover for use in gear well, Accordion-style cover comprising installation side slit for use in gear well, Accordion-style cover with water-absorbent center with transparent wings or flaps, Accordion-style gear well cover centered within transparent console mat, Accordion-style cover with transparent pad with wings or flaps or pockets for positional stability, Accordion-style cover with transparent pad with covered wings or flaps, but many variations, alternatives, or combinations of these are possible and anticipated by the invention.

Securing approaches can in general include use of elastic material, Velcro™, fasteners, fastening arrangements, and adhering arrangements, including but not limited snaps, clips, buttons, laces, hooks, zippers, glues, etc. Further, in some configurations it can also be advantageous or necessary to include slits, openings, gaps, etc. in the sheet, for example for use with fasteners or securing arrangements.

5.1 Accordion Style Cover with Pleated Cover

Figures 12A, 12B:
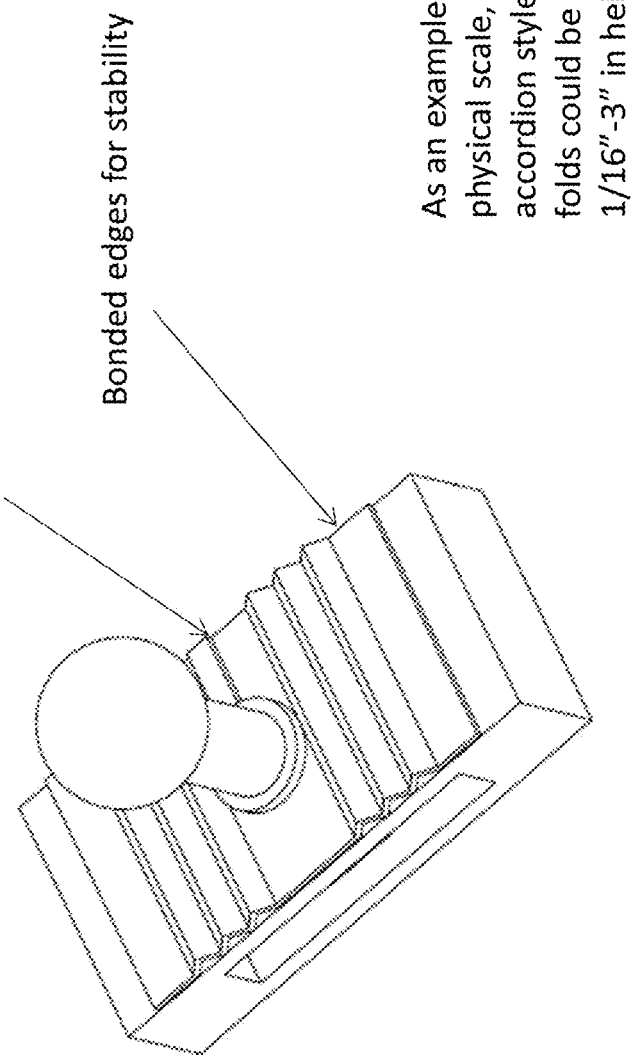
FIG. 12A depicts an example arrangement comprising a fluid-impervious and/or fluid-repellant transparent material covering the console in sizes as per various truck/auto models.
FIG. 12B depicts an example of the physical scale of accordion style folds of an embodiment of the invention.

FIG. 12A depicts an example arrangement comprising a fluid-impervious and/or fluid-repellant material rendered in an in accordion structure. In an example implementation, a transparent fluid-impervious and/or fluidic-repellant material can be configured to have accordion style folds. As an example of physical scale, the accordion style folds could be ⅟16" to 3" in height, as suggested in FIG. 12B. Such an accordion structure arrangement can be configured to compress and expansively stretch as imposed by the position and movement of the gear shift handle. The collapse and stretching/expanding capabilities can be used to implement a contiguous segment of protective material that be configured to keep the gear shift area covered to avoid leakage and flow of any fluid spillage.

Additionally, this example embodiment can also be configured to include adhesive regions so as to removably adhere to the console to provide positional stability. In addition to bottom edge regions, in some applications it can be additionally advantageous for the embodiments to additionally provide adhesive regions to top portions of edge regions for additional positional stability.

Alternatively, a highly fluid-absorbent transparent material can be used instead of the fluid-impervious and/or fluid-repellant transparent material described above. In one implementation, a fluid-impervious and/or fluid-repellant transparent material can be positioned beneath the fluid-absorbent transparent material to prevent any spilled fluid and keep it from penetrating into mechanisms below the console.

An example size range for a base enveloping and securing the accordion structure could be 5-8" long depending on the make and model of the car console.

In another aspect of the invention, at least part of the sheet is fitted with a securing element for securing the sheet into an operating position. In an example implementation, the securing element comprises an elastic band. In another example implementation, the securing element comprises an adjustable belt. In yet another example implementation, the securing element comprises a clip.

5.2 Accordion-Style Cover with Pleated Cover Comprising Installation Side Slit

Figure 13:
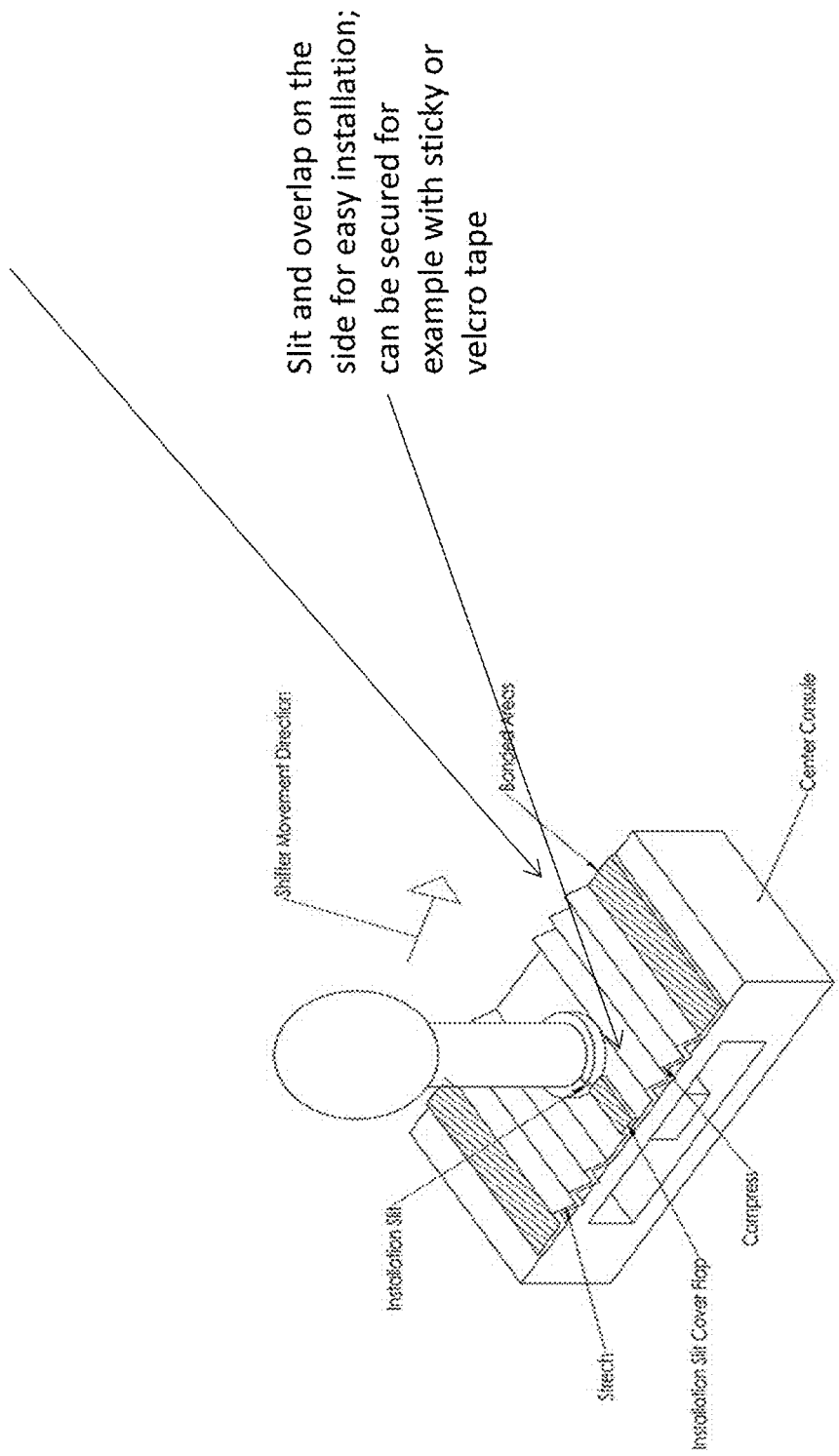
FIG. 13 depicts an example arrangement comprising a highly absorbent, fluid-impervious, and/or fluid-repellant clear/transparent material rendered in an in accordion structure, arranged for example to compress and expansively stretch as imposed by the position and movement of the gear shift handle; this example can also include a slit or opening, (for example, located on the side) for easy installation with a flap.

FIG. 13 depicts an example arrangement comprising a fluid-impervious and/or fluid-repellant transparent material rendered in an in accordion structure, arranged for example to compress and expansively stretch as imposed by the position and movement of the gear shift handle. Such an implementation is comparable to the implementations described in Section 5.1 above, but here is further configured for easy installation facilitated by a side slit to accommodate a gear shaft stick. The transparent fluid-impervious and/or fluidic-repellant material deflects the fluid from getting into the gear shift well.

The side slit can be additionally configured to provide a covering wing or flap to cover the side slit, and the covering wing or flap can be configured to prevent fluid entry through the side slit. The side slit and overlapping flap can be configured to secure the embodiment to gear shaft stick. In one approach, the slit and overlap on the side for easy installation; can be secured for example with sticky or Velcro™ tape, or other securing approaches such as those involving fasteners, fastening arrangements, and adhering arrangements, including but not limited snaps, clips, buttons, laces, hooks, zippers, glues, etc.

Additionally, this example implementation can also be configured to include adhesive regions so as to removably adhere to the console to provide positional stability.

As an example of physical scale, the accordion style folds could be $\frac{1}{16}$" to 3" in height, as suggested in FIG. 12B. A another example of physical scale, a size range for a base enveloping and securing the accordion structure could be 5" to 8" long, for example as could be selected as appropriate for various specific makes and models of the car, automobile, truck, or other type of vehicle.

Alternatively, a highly fluid-absorbent transparent material can be used instead of the fluid-impervious and/or fluid-repellant transparent material described above. In one implementation, a fluid-impervious and/or fluid-repellant transparent material can be positioned beneath the fluid-absorbent transparent material to prevent any spilled fluid and keep it from penetrating into mechanisms below the console.

Figure 14:
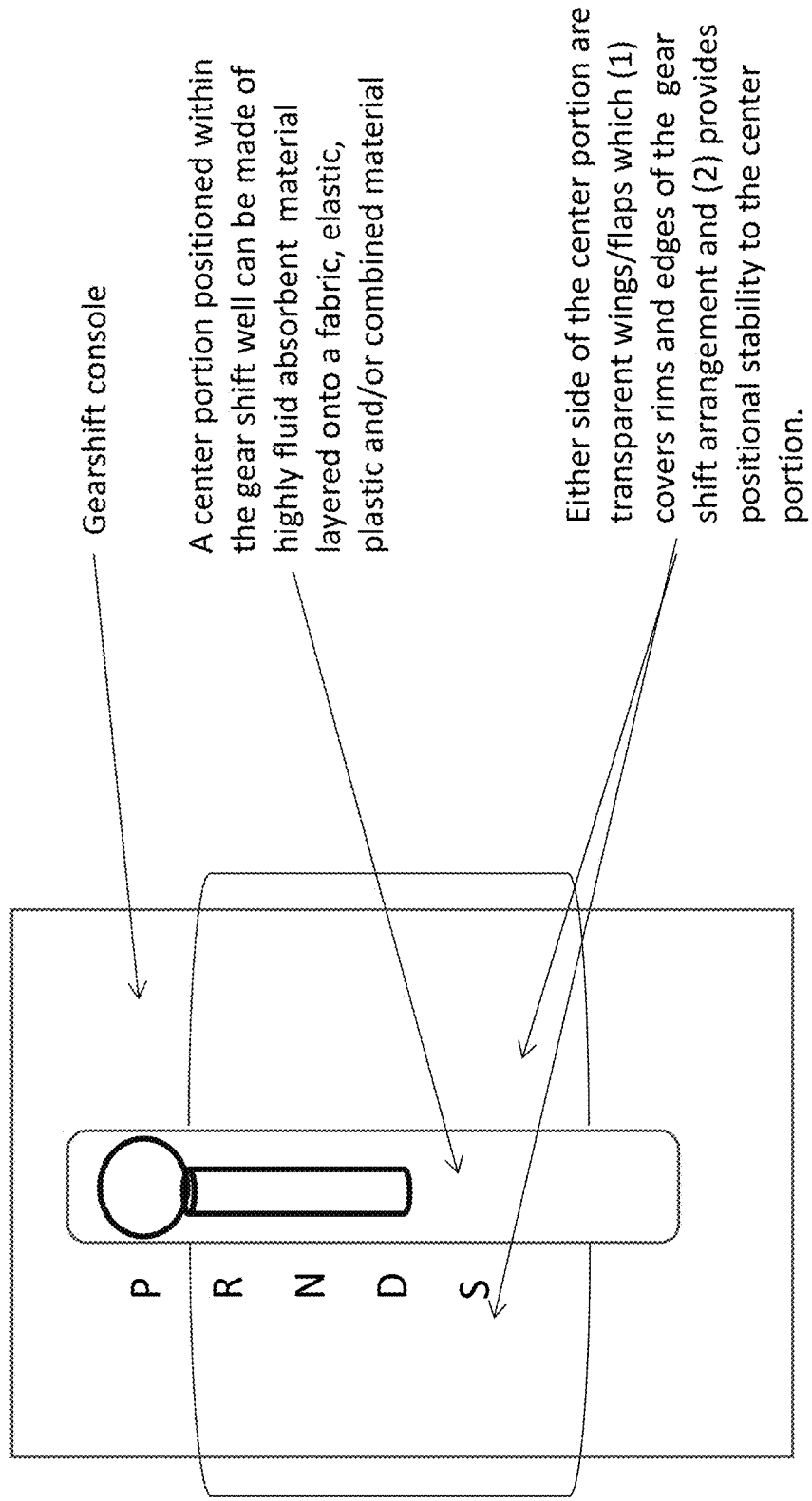
FIG. 14 depicts an example arrangement comprising a highly absorbent material or pad which is positioned in the well or gear track facilitating the travel path of the gear shift.

5.3 Accordion-Style Cover with Water-Absorbent Center with Transparent Wings or Flaps FIG. 14 depicts an example arrangement comprising a highly absorbent material or pad which is positioned in the well or track facilitating the travel path of the gear shift. In an implementation, the highly absorbent material or pad can be configured to expand and contract according to movement of a gear shift handle. In one approach, the fluid repelling material comprises wings or flaps arranged to cover the top of console to provide additional positional stability.

This arrangement depicted in FIG. 14 differs from the accordion design described previously described in FIG. 12A and FIG. 13. In those previous designs, the accordion material spans widely across the center console. In contrast, the arrangement depicted in FIG. 14 is configured so that an accordion structure is implemented in a central region (the well), for example arranged to fit only over the gear well, providing a clear/transparent pad outside the central area.

In an implementation, a center portion positioned within the gear shift well can be made of highly fluid absorbent material layered onto a fabric, elastic, plastic and/or combined material.

Such an example implementation can also be configured to include adhesive regions so as to removably adhere to the console to provide positional stability. In addition to bottom edge regions, in some applications it can be additionally advantageous for the embodiments to additionally provide adhesive regions to top portions of edge regions for additional positional stability.

In another aspect of the invention, configured for a console comprising two console sides, the sheet comprises extended portions for draping down each of the two console sides.

Additionally, a highly fluid-absorbent transparent material can be used instead of the fluid-impervious and/or fluid-repellant transparent material described above. In one implementation, a fluid-impervious and/or fluid-repellant transparent material can be positioned beneath the fluid-absorbent transparent material to prevent any spilled fluid and keep it from penetrating into mechanisms below the console.

5.4 Accordion-Style Gear Well Cover Centered within Transparent Console Mat

Figure 15:
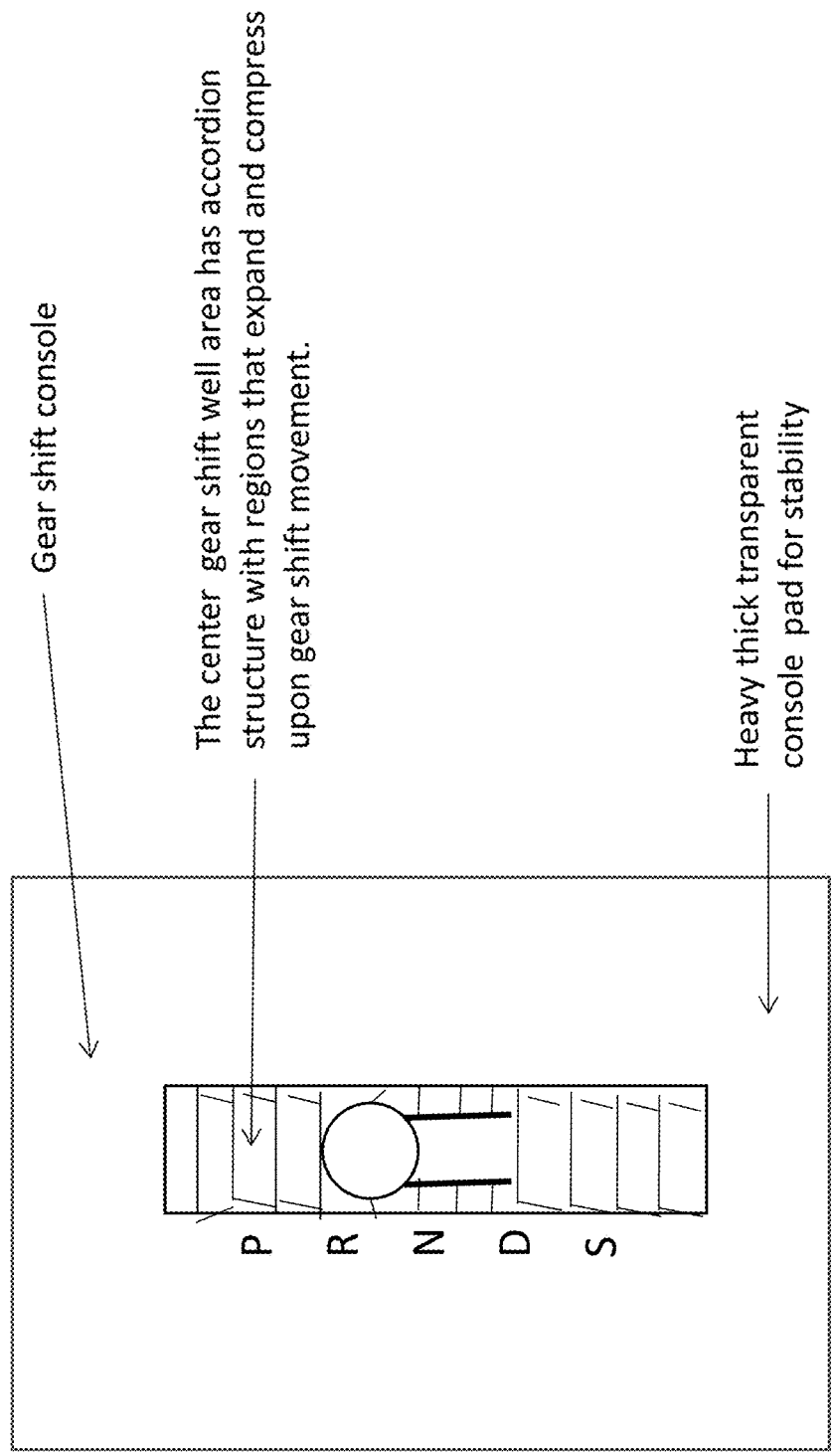
FIG. 15 depicts an arrangement comprising of accordion shape positioned in the center of the gear handle area of the console or a gear well provisioned within the console, comprising a highly absorbent, fluid-impervious, and/or fluid-repellant transparent material rendered in a rectangular or center console shape structure, to compress and expansively stretch as imposed by the position and movement of the gear shift handle.

FIG. 15 depicts an arrangement comprising of accordion shape in the center of the console made of a highly absorbent or fluid-impervious and/or fluid-repellant transparent material rendered in a rectangular or center console shape structure, to compress and expansively stretch as imposed by the position and movement of the gear shift handle. In an example implementation, the center portion is stretchable to slip over the gear handle adhering closely to gear shift stick. The opposite sides are the bonded area which holds the unit in position. When gear shift moves between positions, one accordion portion stretches while the other accordion portion compresses.

In an implementation, this example embodiment can comprise a heavy thick transparent pad attached to or incorporated with the center accordion portion for positional stability.

Such an example implementation can also be configured to include adhesive regions so as to removably adhere to the console to provide positional stability. In addition to bottom edge regions, in some applications it can be additionally advantageous for the embodiments to additionally provide adhesive regions to top portions of edge regions for additional positional stability.

Additionally, a highly fluid-absorbent transparent material can be used instead of the fluid-impervious and/or fluid-repellant transparent material described above. In one implementation, a fluid-impervious and/or fluid-repellant transparent material can be positioned beneath the fluid-absorbent transparent material to prevent any spilled fluid and keep it from penetrating into mechanisms below the console.

Figure 16:
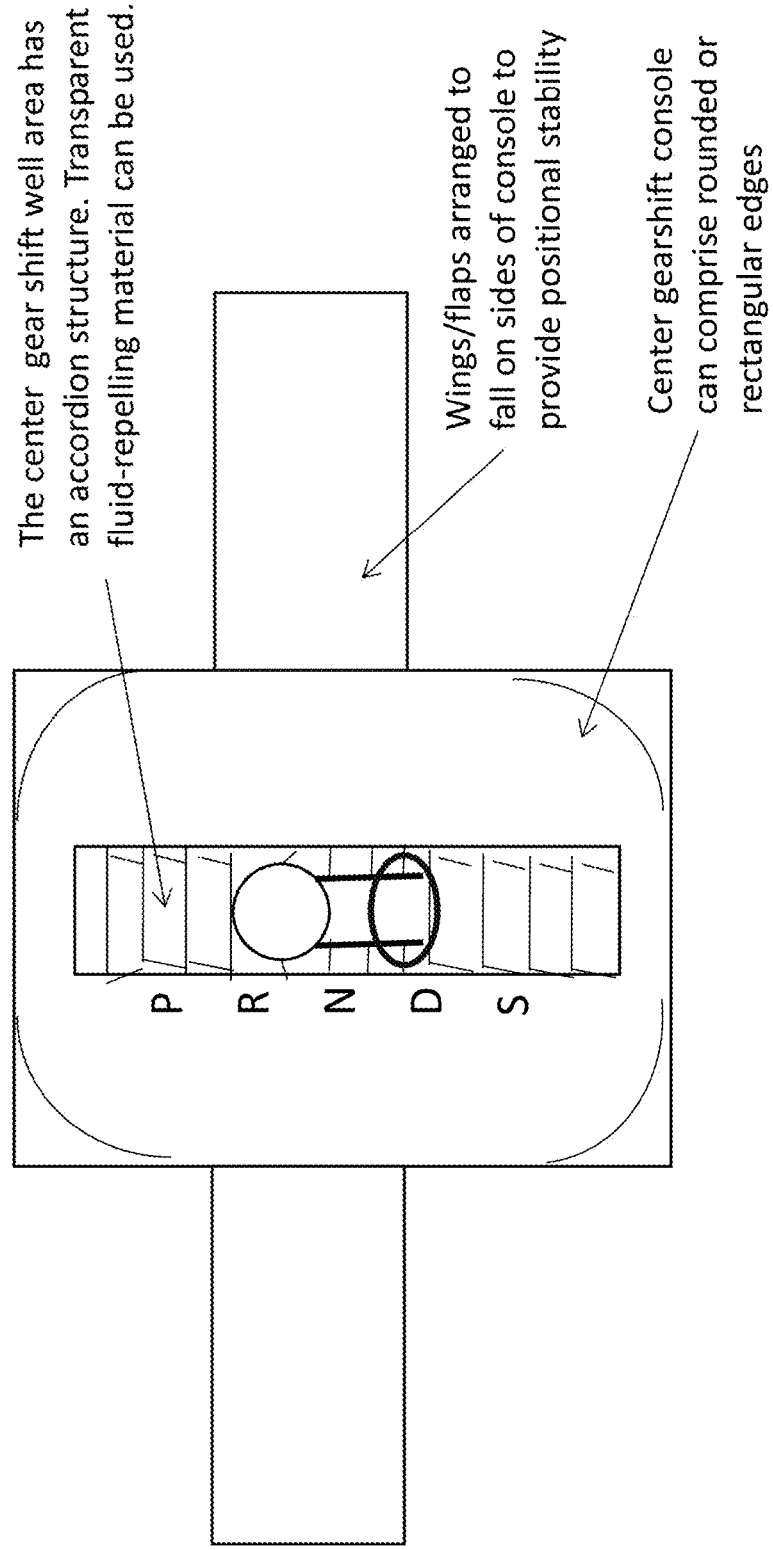
FIG. 16 depicts an arrangement comprising of accordion shape in the center of the gear handle area of the console or a gear well provisioned within the console, comprising a highly absorbent, fluid-impervious, and/or fluid-repellant transparent material rendered in a rectangular or center console shape structure, to compress and expansively stretch as imposed by the position and movement of the gear shift handle; this example can also include extended portions or wings arranged to draped from the sides to provide additional stability. Weights can be included in edges of the sheet, for example in the extended portions or wings.

5.5 Accordion-Style Cover with Transparent Pad with Wings, Flaps or Pockets for Positional Stability FIG. 16 depicts an example arrangement similar to that depicted in FIG. 15 but wherein additional extended portions of material are included to provide flaps or wings arranged to fall along-side of or drape over either side of the center gear console are added on each side. These additional flaps or wings can be configured to provide additional positional stability during gear shift operation.

In an example implementation, the arrangement can comprise a heavy thick transparent material in the form of pad attached to or incorporated within at least the center accordion portion. In an example implementation, the flaps or wings that fall on the side of the center gear console can also comprise a heavy thick transparent material.

Such an example implementation can also be configured to include adhesive regions so as to removably adhere to the console to provide positional stability. In addition to bottom edge regions, in some applications it can be additionally advantageous for the embodiments to additionally provide adhesive regions to top portions of edge regions for additional positional stability.

In another aspect of the invention, configured for a console comprising two console sides, the sheet comprises extended portions for draping down each of the two console sides.

Additionally, a highly fluid-absorbent transparent material can be used instead of the fluid-impervious and/or fluid-repellant transparent material described above. In one implementation, a fluid-impervious and/or fluid-repellant transparent material can be positioned beneath the fluid-absorbent transparent material to prevent any spilled fluid and keep it from penetrating into mechanisms below the console.

5.6 Accordion-Style Cover with Transparent Pad with Covered Wings or Flaps

Figure 17:
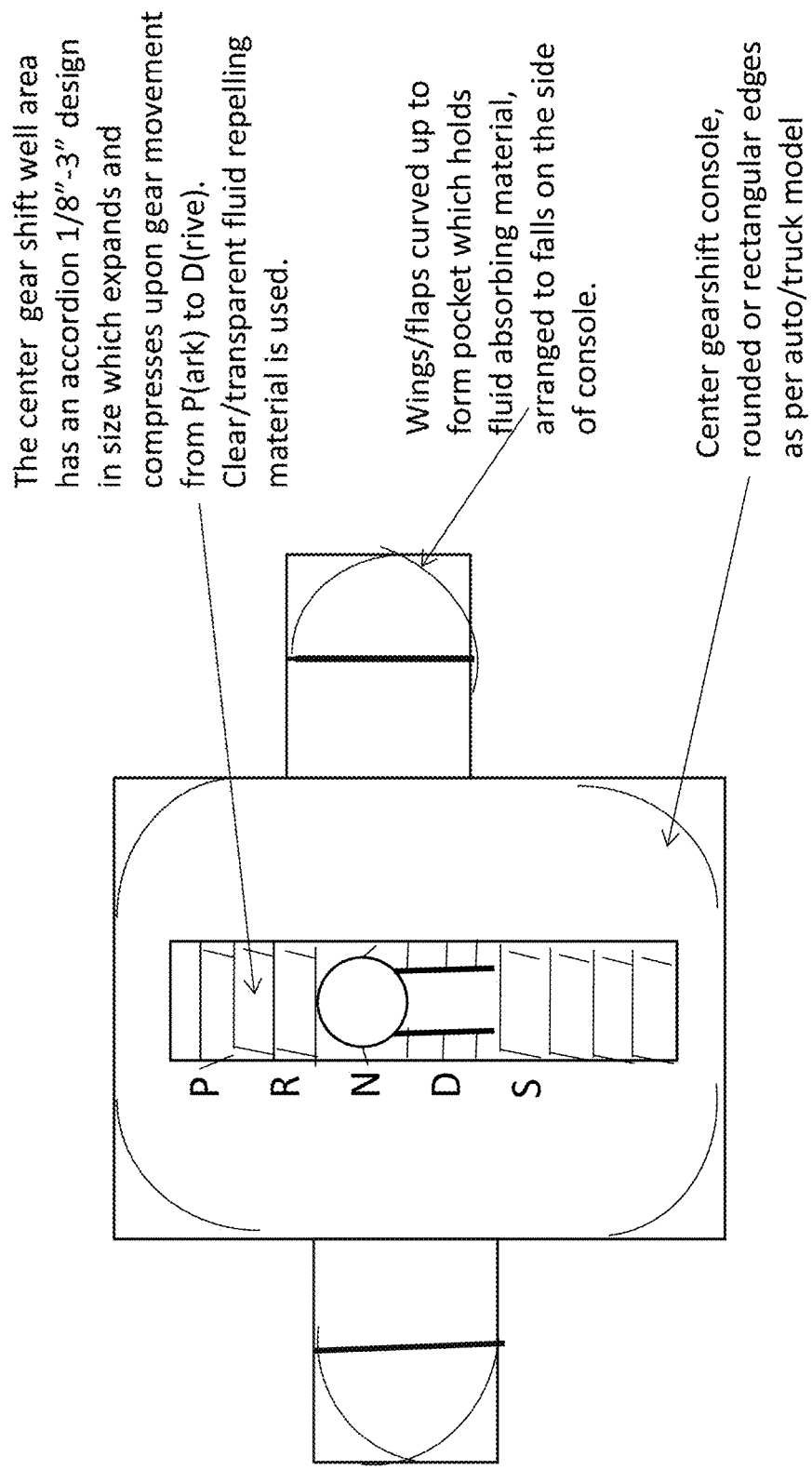
FIG. 17 depicts an arrangement comprising of accordion shape in the center of the gear handle area of the console or a gear well provisioned within the console, comprising a highly absorbent, fluid-impervious, and/or fluid-repellant transparent material rendered in a rectangular or center console shape structure, to compress and expansively stretch as imposed by the position and movement of the gear shift handle; this example can also include curved wings or pouches (to catch an contain fluids and debris), which in turn can additionally be arranged to hold fluid absorbing material.

FIG. 17 depicts an example variation of the arrangement depicted in FIG. 16 but is further configured so that provided wings or flaps comprise a pockets or pouches for capturing and containing fluids and debris, and these wings can be configured to include fluid absorbent material.

In this arrangement, the center part of the gear console has an accordion design. In some embodiments, wings or flaps are arranged to fall on one or more sides of the console. In some embodiments, wings or flaps can comprise a pocket holding high fluid-absorbency material. Accidental fluid spills can flow into the pocket wherein the fluid can be absorbed by the highly absorbent material.

In some embodiments, the arrangement can comprise a heavy thick clear/transparent pad attached to or incorporated with the center accordion portion.

In some embodiments, the base is rectangular. In other embodiments, the base can comprise rounded corners.

Such an example implementation can also be configured to include adhesive regions so as to removably adhere to the console to provide positional stability. In addition to bottom edge regions, in some applications it can be additionally advantageous for the embodiments to additionally provide adhesive regions to top portions of edge regions for additional positional stability.

In another aspect of the invention, configured for a console comprising two console sides, the sheet comprises extended portions for draping down each of the two console sides.

5.7 Summary of Example Accordion Arrangements for Use in a Gear Well

In an aspect of the invention, at least part of the sheet is configured to form a bellows comprising a linear sequence of folds.

In another aspect of the invention, at least part of the bellows has a collapsible and extendable accordion bellows structure.

In another aspect of the invention, at least part of the sheet is fitted with a securing element for securing the sheet into an operating position. In an example implementation, the securing element comprises an elastic band. In another example implementation, the securing element comprises an adjustable belt. In yet another example implementation, the securing element comprises a clip.

In another aspect of the invention, the sheet can be configured to include adhesive regions so as to removably adhere to the console to provide positional stability. Securing approaches can in general include use of elastic material, Velcro™, fasteners, fastening arrangements, and adhering arrangements, including but not limited snaps, clips, buttons, laces, hooks, zippers, glues, etc. Further, in some configurations it can also be advantageous or necessary to include slits, openings, gaps, etc. in the sheet, for example for use with fasteners or securing arrangements.

In another aspect of the invention, the sheet comprises edges, and wherein at least one of the edges is provided with weighting material.

In another aspect of the invention, at least part of the sheet is fitted with an absorptive material.

In another aspect of the invention, configured for a console comprising two console sides, the sheet comprises extended portions for draping down each of the two console sides.

6. Example Combination Arrangements

The invention provides for combination of features and arrangements described above and variations of them.

Figure 18:
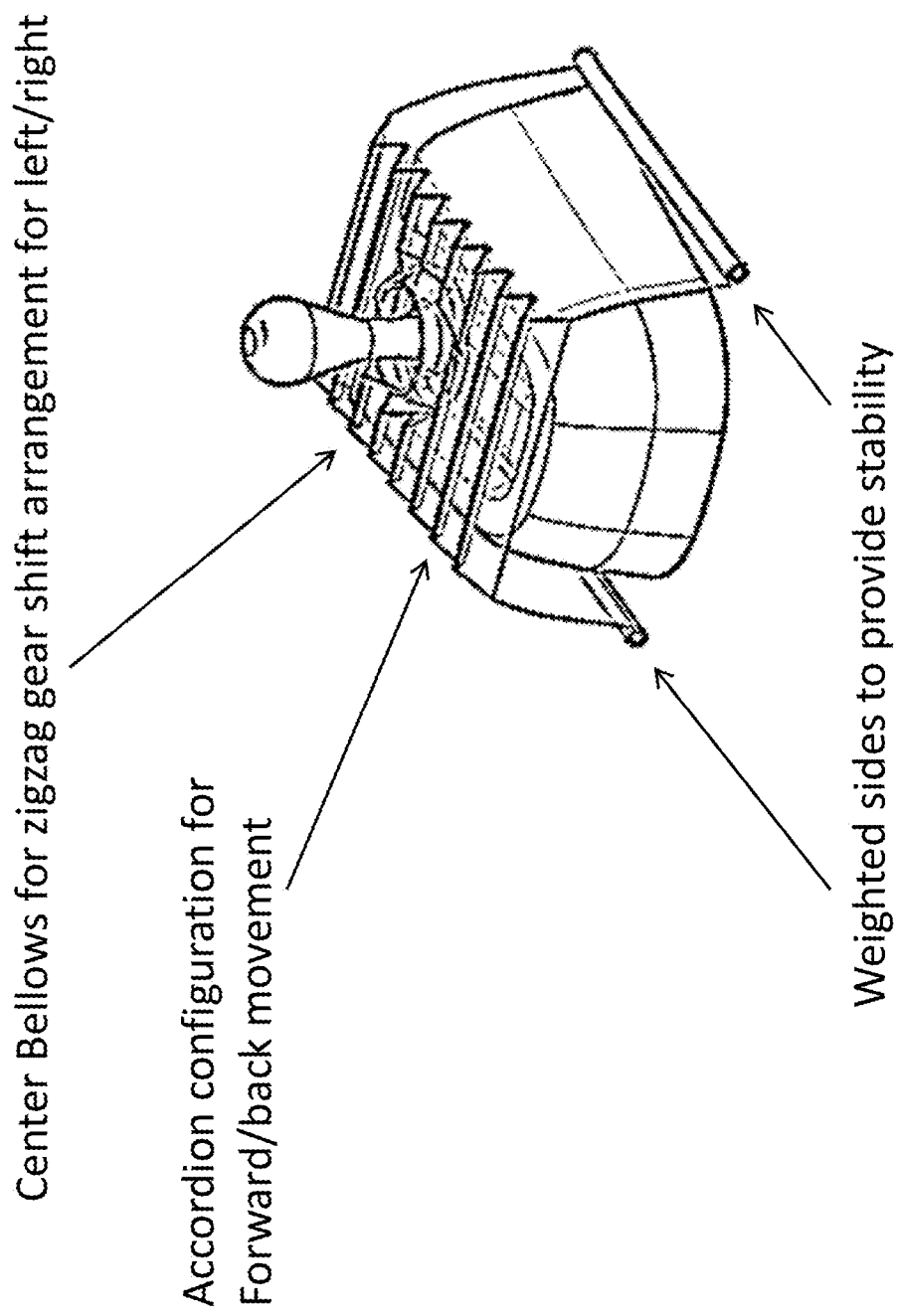
FIG. 18 depicts an example arrangement comprising a highly absorbent, fluid-impervious, and/or fluid-repellant clear/transparent material rendered in an in accordion structure, arranged for example to compress and expansively stretch as imposed by the position and movement of the gear shift handle. This example arrangement can include a bellows and/or accordion structure, and can be configured to accommodate at least two-direction or zigzag motion of the gearshift; additionally it can include weighted edges to provide stability.

For example, FIG. 18 depicts an example combination arrangement comprising:

A fluid-impervious and/or fluid-repellant transparent material rendered in an in accordion structure, arranged for example to compress and expansively stretch as imposed by the position and movement of the gear shift handle, An example center-area concentric circular bellows which can be configured to slip over the gear shift handle for easy installation, Example arrangement with weighted sides to provide positional stability.

Such an arrangement can be useful, for example, in accommodating a gear shift arrangement that requires zigzag.

Accordingly, in another aspect of the invention, configured for a gear shift arrangement requiring a zigzag operation of the gear shift stick, the zigzag operation comprising motion in at least two orthogonal directions, wherein the sheet comprises a centered bellows arrangement configured to accommodate movements of the gear shift stick comprising the at least two orthogonal directions.

In another aspect of the invention, configured for a console comprising two console sides, the sheet comprises extended portions for draping down each of the two console sides. Weights can be included in edges of the sheet, for example in the extended portions.

Additional variations can alternatively include providing adhesive regions so as to removably adhere to the console to provide positional stability. Securing approaches can in general include use of elastic material, Velcro™, fasteners, fastening arrangements, and adhering arrangements, including but not limited snaps, clips, buttons, laces, hooks, zippers, glues, etc. Further, in some configurations it can also be advantageous or necessary to include slits, openings, gaps, etc. in the sheet, for example for use with fasteners or securing arrangements.

CLOSING

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

While the invention has been described in detail with reference to disclosed embodiments, various modifications within the scope of the invention will be apparent to those of ordinary skill in this technological field. It is to be appreciated that features described with respect to one embodiment typically can be applied to other embodiments.

The invention can be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

Although exemplary embodiments have been provided in detail, various changes, substitutions and alternations could be made thereto without departing from spirit and scope of the disclosed subject matter as defined by the appended claims. Variations described for the embodiments may be realized in any combination desirable for each particular application. Thus, particular limitations and embodiment enhancements described herein, which may have particular advantages to a particular application, need not be used for all applications. Also, not all limitations need be implemented in methods, systems, and apparatuses including one or more concepts described with relation to the provided embodiments. Therefore, the invention properly is to be construed with reference to the claims.

What is claimed is:

1. An overlaying protective apparatus to be used with a vehicle, the apparatus for preventing liquids or debris from entering a vehicle gear shift mechanism of the vehicle, said vehicle comprising a console located in an area between an area for a driver of the vehicle and an adjacent area for an optional passenger, the console comprising a movable gear shift stick rising from an opening or movable arrangement in a top region of the console, the movable gear shift stick affixed at its top with a gear shift handle, the protective apparatus comprising:
   a fluid-impervious accordioned sheet of transparent material, the sheet in position over the console without attaching to or otherwise being secured to an underside portion of the console, a hole in the sheet through which gear shift handle can traverse through,
   wherein the sheet is configured to be arranged when installed so as to cover the opening or movable arrangement in the console so as to prevent liquids or debris from entering the vehicle gear shift mechanism through the opening or movable arrangement in the console;
   wherein installation of the overlaying protective apparatus does not require modification of any of the vehicle, the vehicle gear shift mechanism, or the console;
   wherein installation of the overlaying protective apparatus is not required at the time of manufacture of any of the vehicle, the vehicle gear shift mechanism, or the console, and
   wherein the sheet is configured, when installed, to allow the driver to see through the sheet to view the top region of the console.

2. The protective apparatus of claim 1, wherein at least part of the sheet comprises a concentric sequence of folds.

3. The protective apparatus of claim 1, wherein at least part of the sheet comprises a linear sequence of folds.

4. The protective apparatus of claim 3, wherein at least part of the sheet is collapsible and extendable.

5. The protective apparatus of claim 1, wherein at least part of the sheet is fitted with a securing element for securing the sheet into an operating position.

6. The protective apparatus of claim 5, wherein the securing element comprises an elastic band.

7. The protective apparatus of claim 5, wherein the securing element comprises an adjustable belt.

8. The protective apparatus of claim 1, wherein at least part of the sheet is fitted with an absorptive material.

9. The protective apparatus of claim 1, further configured for a console comprising two console sides, wherein the sheet additionally comprises extended portions for draping down each of the two console sides.

10. The protective apparatus of claim 1, further configured for a gear shift arrangement requiring a zigzag operation of the gear shift stick, the zigzag operation comprising motion in at least two orthogonal directions, wherein the sheet is configured to accommodate movements of the gear shift stick comprising the at least two orthogonal directions.

11. The protective apparatus of claim 1, wherein the sheet further comprises edges, and wherein at least one of the edges is provided with weighting material.

\* \* \* \* \*